United States Patent
Kerpez et al.

(10) Patent No.: US 10,374,887 B2
(45) Date of Patent: Aug. 6, 2019

(54) SYSTEMS, METHODS, AND APPARATUSES FOR IMPLEMENTING THE VIRTUALIZATION OF ACCESS NODE FUNCTIONS

(71) Applicant: Adaptive Spectrum and Signal Alignment, Inc., Redwood City, CA (US)

(72) Inventors: Kenneth J. Kerpez, Long Valley, NJ (US); John M. Cioffi, Atherton, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 15/506,102

(22) PCT Filed: Aug. 27, 2014

(86) PCT No.: PCT/US2014/053008
§ 371 (c)(1),
(2) Date: Feb. 23, 2017

(87) PCT Pub. No.: WO2016/032467
PCT Pub. Date: Mar. 3, 2016

(65) Prior Publication Data
US 2017/0272311 A1    Sep. 21, 2017

(51) Int. Cl.
*H04L 12/24* (2006.01)
*H04L 12/28* (2006.01)

(52) U.S. Cl.
CPC ........ *H04L 41/082* (2013.01); *H04L 12/2878* (2013.01); *H04L 12/2894* (2013.01);
(Continued)

(58) Field of Classification Search
CPC ............... H04L 41/082; H04L 12/2894; H04L 41/0631; H04L 41/0672; H04L 41/14
See application file for complete search history.

(56) References Cited

U.S. PATENT DOCUMENTS 8,804,720 B1    8/2014  Rainovic et al.
2002/0173310 A1*  11/2002  Ebata .................... H04L 45/122
                                                                                455/445
(Continued)

FOREIGN PATENT DOCUMENTS

WO    WO 2011054006 A2    5/2011

OTHER PUBLICATIONS

Extended European Search Report dated Jan. 22, 2018, in European Patent Application No. 14900509.2 (12pgs).
(Continued)

*Primary Examiner* — Ronald B Abelson
(74) *Attorney, Agent, or Firm* — North Weber & Baugh LLP

(57) ABSTRACT

In accordance with embodiments disclosed herein, an exemplary system or computer implemented method for implementing the virtualization of access node functions may include, for example: a memory to store instructions for execution; one or more processors to execute the instructions; a control plane interface to communicably interface the system with an access node over a network, in which the access node is physically coupled with a plurality of broadband lines; a virtualized module to provide a virtualized implementation of a plurality of functions of the access node at the system, in which the virtualized module executes on a virtualized computing infrastructure; the control plane interface of the system to receive current operational data and current operating conditions for the plurality of broadband lines from the access node; the virtualized module to update the virtualized implementation of the plurality of functions of the access node at the system according to the current operational data and the current operating conditions received from the access node; an analysis module to analyze the current operational data and the current operat- (Continued)

ing conditions received from the access node; an instruction module to generate control parameters to affect operation of the access node based on the analysis of the current operational data and the current operating conditions received; and the control plane interface to send the control parameters to the access node for adoption at the access node. Other related embodiments are disclosed.

27 Claims, 13 Drawing Sheets

(52) U.S. Cl.
CPC .......... *H04L 41/04* (2013.01); *H04L 41/0631* (2013.01); *H04L 41/0672* (2013.01); *H04L 41/0823* (2013.01); *H04L 41/0896* (2013.01); *H04L 41/14* (2013.01); *H04L 41/142* (2013.01); *H04L 41/0213* (2013.01); *H04L 41/5096* (2013.01)

(56) References Cited

U.S. PATENT DOCUMENTS

| | | |
|---|---|---|
| 2007/0101377 A1 | 5/2007 | Six et al. |
| 2010/0157887 A1 | 6/2010 | Kopplin |
| 2014/0101374 A1 | 7/2014 | Ashwood-Smith et al. |
| 2014/0201374 A1* | 7/2014 | Ashwood-Smith ..... H04L 49/70 709/226 |
| 2014/0229945 A1 | 8/2014 | Barkai et al. |
| 2015/0109922 A1* | 4/2015 | Teng ....................... H04L 47/12 370/230 |

OTHER PUBLICATIONS

Communication pursuant to Rules 161(2) and 162 EPC dated Jul. 4, 2017, in European Patent Application No. 14900509.2 (2pgs).
Response as filed Oct. 16, 2017, in European Patent Application No. 14900509.2 (11pgs).
International Search Report and Written Opinion for International Patent Application PCT/US2014/053008.
Kerpez, Ken et al., "Software-Defined Access Network (SDAN)," 2014 48th Annual Conference on Information Sciences and Systems (CISS), IEEE, Mar. 19, 2014, pp. 1-6, XP032594457, doi: 10.1109/ciss.2014.6814134 [retrieved on May 9, 2014] * p. 1, line 1-p. 6, right-hand column, line 19; figure 6 * (6pgs).
Kerpez, Ken et al., "Software-Defined Access Network (SDAN)," Jun. 12, 2014, Retrieved from the Internet: URL: http://www.assia-inc.com/technology-media/knowledge-center/white-papers/SDAN.pdf [retrieved on Jan. 11, 2018] *p. 1, line 1-p. 12, line 25 * (15pgs).
Ginis, George, "What is a Software-Defined Access Network?", Jul. 16, 2014, pp. 1-6, XP055440224, Retrieved from the Internet; URL: https://www.sdxcentral.com/articles/contributed/what-is-a-software-defined-access-network-george-ginis/2014/07/ [retrieved on Jan. 11, 2018] * p. 1, line 1-p. 3, line 6 * (6pgs).
European Telecommunications Standards Institute (ETSI), "Network Functions Virtualisation (NFV); Use Cases," Group Specification, vol. NFV, No. V!.1.1, Oct. 1, 2013, XP014157405, * chapter 13, "Use case #9; Fixed Network Functions Virtualisation" * (50pgs).

* cited by examiner

SYSTEMS, METHODS, AND APPARATUSES FOR IMPLEMENTING THE VIRTUALIZATION OF ACCESS NODE FUNCTIONS

CLAIM OF PRIORITY

This Application is a National Stage Entry of, and claims priority to, PCT Application No. PCT/US14/53008, filed on 27 Aug. 2014 and titled "SYSTEMS, METHODS, AND APPARATUSES FOR IMPLEMENTING THE VIRTUALIZATION OF ACCESS NODE FUNCTIONS," which is incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the fields of computing and digital communications, and more particularly, to systems, methods, and apparatuses for implementing the virtualization of access node functions as well as the systems, methods, and apparatuses for implementing Persistent Management Agent (PMA) functions for the control and coordination of DPU and DSLAM components.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In the networking arts the computational burdens set upon remotely deployed network components, (e.g., such as Distribution Point Units (DPUs) and Digital Subscriber Line Access Multiplexers (DSLAMs) deployed into the field) are increasing, requiring these network components to take on increased roles, while at the same time, the physical size of these units have been trending toward becoming smaller. Although the size of such network components are trending smaller, the physical space available within cabinets which hold such components may nevertheless be constrained. Further still, remote cooling capacity and electrical requirements are sometimes constrained and are universally more costly than equivalent power consumption at a well designed data center.

Unlike specialized network components conventionally deployed into the field, data centers leverage low-cost commoditized hardware to instantiate many virtual machines enabling a significantly lower cost per computation at each such virtual machine, below that of dedicated computers, and far below that of dedicated computational hardware and circuitry of network-located equipment.

As network components become smaller and are deployed further into the supporting network they become increasingly expensive, increasingly complex, and increasingly difficult to manage. Powering such devices may be limited or intermittent, for instance, as commonly happens when reverse powering such devices via power provided from the CPE is interrupted, as some CPE devices may be turned off and thus, cease the flow of power to the supported network component.

The Access Node (also referred to as "AN") is the first aggregation point in the access network. An Access Node may itself be any of a DSLAM, a DPU, an OLT ("Optical Line Termination" unit), a CMTS ("Cable Modem Termination System"), an Ethernet aggregation switch, etc. As broadband speeds increase, the increased speeds mandate the deployment, support, and utilization of ever advanced signal processing and scheduling capabilities for access nodes, all of which increases computation and storage requirements at the remotely deployed network components, which in turn squeezes the computational capabilities and computing resources available at the access nodes. At the same time data centers and the cloud have ever increasing computational and storage capabilities at decreasing costs using commodity hardware. New methods to virtualize the functions in the access node and leverage virtualized computing resources are now becoming useful.

Centralization of certain remotely deployed network components may help to alleviate some of the constraints and computational burdens placed upon such field components, however, the entities conventionally responsible for manufacturing such components have yet to provide any workable solutions.

The present state of the art may therefore benefit from systems, methods, and apparatuses for implementing the virtualization of access node functions as well as the systems, methods, and apparatuses for implementing Persistent Management Agent (PMA) functions for the control and coordination of DPU and DSLAM components as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
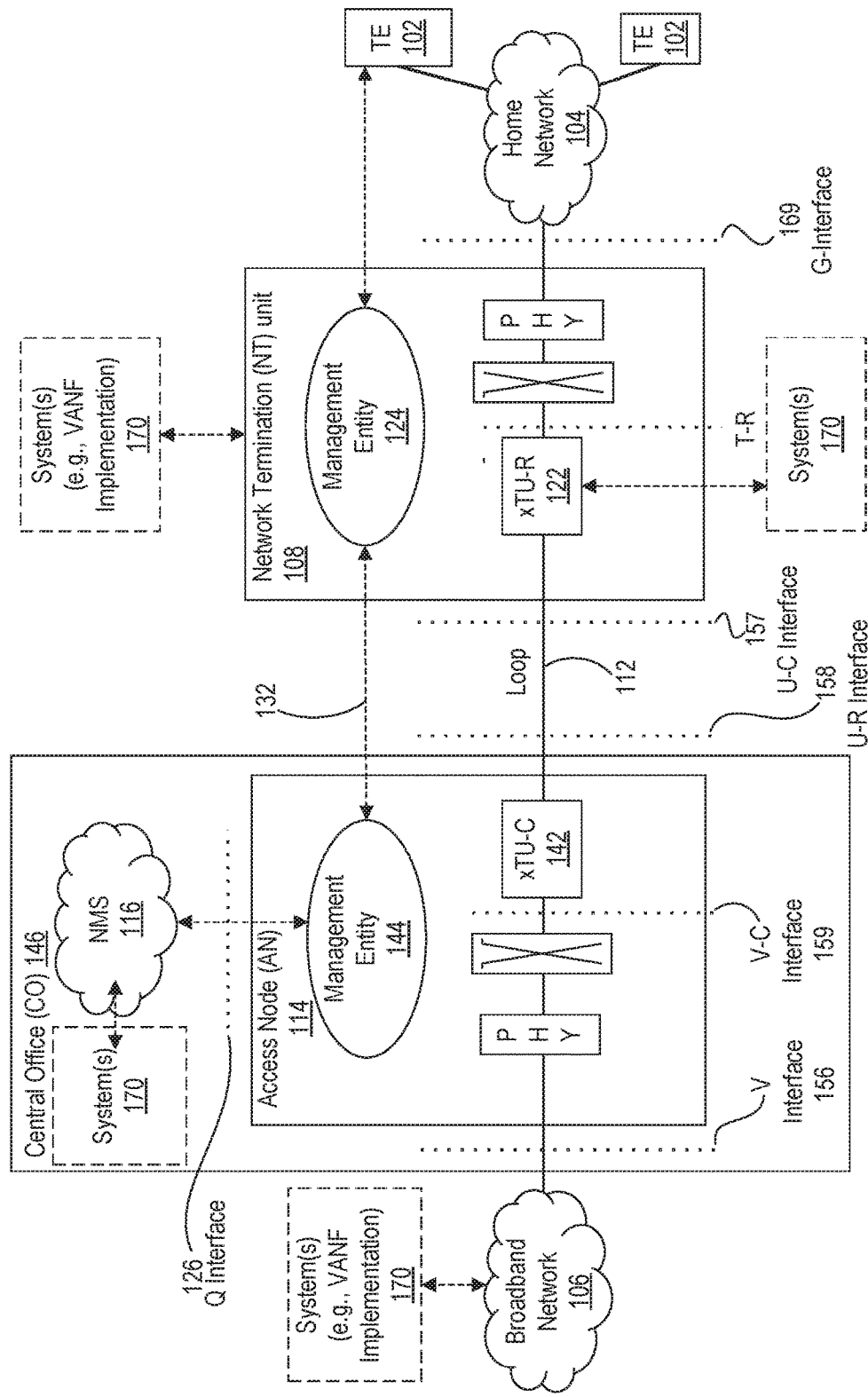
FIG. 1 illustrates an exemplary architecture in which embodiments may operate.

Described herein are apparatuses, systems and methods for implementing the virtualization of access node functions as well as the systems, methods, and apparatuses for implementing Persistent Management Agent (PMA) functions for the control and coordination of DPU and DSLAM components.

In accordance with one embodiment, an exemplary system or computer implemented method for implementing the virtualization of access node functions may include, for example: a memory to store instructions for execution; one or more processors to execute the instructions; a control plane interface to communicably interface the system with an access node over a network, in which the access node is physically coupled with a plurality of broadband lines; a virtualized module to provide a virtualized implementation of a plurality of functions of the access node at the system, in which the virtualized module executes on a virtualized computing infrastructure; the control plane interface of the system to receive current operational data and current operating conditions for the plurality of broadband lines from the access node; the virtualized module to update the virtualized implementation of the plurality of functions of the access node at the system according to the current operational data and the current operating conditions received from the access node; an analysis module to analyze the current operational data and the current operating conditions received from the access node; an instruction module to generate control parameters to affect operation of the access node based on the analysis of the current operational data and the current operating conditions received; and the control plane interface to send the control parameters to the access node for adoption at the access node.

In accordance with a different embodiment, an exemplary system or computer implemented method for implementing Persistent Management Agent (PMA) functions for the control and coordination of DPU and DSLAM components may include, for example: a memory to store instructions for execution; one or more processors to execute the instructions; a virtualized module operating on virtualized computing infrastructure, in which the virtualized module is to provide a virtualized implementation of a plurality of functions associated with one or more remotely located Distribution Point Units (DPUs) and/or Digital Subscriber Line Access Multiplexers (DSLAMs), each of the one or more remotely located DPUs and/or DSLAMs having a plurality of broadband lines coupled thereto; in which the virtualized module is to further control Persistent Management Agent (PMA) functions and control coordination of the one or more remotely located DPUs and/or DSLAMs and the plurality of broadband lines coupled with the one or more remotely located DPUs and/or DSLAMs by virtualizing one or more functions of the one or more remotely located DPUs and/or DSLAMs to operate on the virtualized computing infrastructure; and a network interface to receive data and send control instructions for operation of the plurality of broadband lines to and from the one or more remotely located DPUs and/or DSLAMs.

Such means enable the virtualization and centralization of functionality deployed at remote network components into more cost efficient and maintenance friendly environments, such as purpose built data centers. Many functions which are conventionally implemented and carried out by the remotely deployed network components do not necessarily require specialized hardware, and as such, may be abstracted from the physical devices via virtualization efforts. However, conventional solutions to date have failed to enable such efforts.

For instance, implementation of VDSL ("Very-high-bit-rate Digital Subscriber Line") technologies requires specialized chipsets; however, such chip manufacturers simply do not provide direct support for the abstraction and virtualization of remotely deployed VDSL capabilities. Within a VDSL capable DSLAM there is required a dedicated processor which draws expensive remote power provided into field deployments, such as network equipment cabinets, etc. Conversely, offloading various functions from the remotely deployed equipment for processing at another purpose build location, such as a data center, provides computational efficiencies, enables access to lower cost electricity and cooling, and may serve to simplify maintenance, upgrades, management, and re-configuration through the economies of scale and centralization inherent to such data centers, versus the many distributed field locations into which the network elements are deployed.

For instance, consider a data center with thousands of racks, each having a dozen rack-mountable units, each with a dozen blade type servers, each blade server having a dozen processors, and each processor having, for example, 16 distinct processing cores, with each processing core capable to support differing virtualized functions or Virtualized Machines (VMs). Such an environment certainly is not without costs including capital cost, cooling costs, electricity costs, and the cost to provide the physical space to house such computational means. However, scaling up such a hardware environment in a centralized location is significantly less expensive to operate on a per virtual machine basis than deploying compute infrastructure in multiple field locations, power for such a hardware environment is less expensive and can be selected for cost-efficiency as well as for access to environmentally friendly power, and maintenance is additionally simplified as it is much easier to facilitate operations of 1000's of virtual machines residing upon hardware in a single physical location than having to send maintenance technicians literally to thousands of deployed field locations across a large geographic region.

Virtualizing network functions makes them readily accessible and relatively easy to upgrade and manage. Virtual network functions can be re-configured and chained together to create new capabilities and new services in increasingly flexible ways that encourage innovation and improve an end-customer's user experience. However, with the exception of back-office and OSS/BSS functionality, such network functions for broadband Internet access have always been performed inside Network Elements (NEs) as it has been thought, incorrectly, that such capabilities cannot be abstracted from the relevant network devices, access nodes, or whatever network components are responsible for their native support and execution.

Access node virtualization in such a broadband networking environment may thus benefit from, among others, savings from using low-cost compute infrastructure in place of expensive computing within the network elements; software upgrades instead of hardware replacements; utilization of Virtual Machines (VMs) that are easily portable and easily backed-up versus physical remotely deployed networking components; rapid and flexible lifecycle management processes; faster order delivery, faster recovery, auto-scaling of capacity to demand, etc.; unified touch-point to simplify management; enablement of infrastructure-sharing; encouragement of services innovation; easier creation of new functions and changes made to change existing functions; utilization of "service chaining" to build up higher-level services from lower-level building blocks; and improved performance and QoE (Quality of Experience) for service subscribers, broadband network operators, broadband technicians, and broadband customers and end-users.

Abstracting many of the functions from remotely deployed network components and virtualizing them onto processing cores and computational hardware in centralized environments or Points of Presence (PoPs) may be accomplished without requiring the specialized chipsets associated with such remote equipment as many such functions that are conventionally implemented by such remote equipment does not necessarily require the specialized circuitry. For instance, the core of an Internet Protocol (IP) router requires dedicated hardware for a subset of its functions, if those functions are to be carried out quickly and efficiently, however, other functions do not require the specialized circuitry and may be carried out via a server within software at any location, regardless of the physical location of the native device. Additionally, virtualizing such functions within software further enables significant flexibility for upgrades, changes, and maintenance, and these may be conducted in a centralized location. The infrastructure for such functionality may thus be implemented by a cloud services provider as a service to other entities, for instance, where a first entity provides the hardware, infrastructure, and relevant computational functionality and access regime through which to access the virtualized functions and then a second entity subscribes or purchases such services from the first, resulting in a mutually beneficial business relationship.

Such a cloud services provider may therefore enable and provide as a service to other entities the infrastructure to support certain Network Service Virtualization (NSV) and/or Software-Defined Access Networks (SDAN) offerings, with the software that performs the functions provided by vendors or operators, and operated by operators. Alternatively, other entities may create the software that performs the functions, or operators may perform NSV and/or SDAN offerings internally on their own hardware within their own data centers.

Access nodes used for Fiber to the distribution point (FTTdp), also known as DPUs or DSLAMs, may be well suited for such virtualization efforts. This is because these access nodes are becoming physically smaller and are being integrated deeper into the network, while at the same time, speeds are increasing and the ANs themselves are handling increasingly complex signal processing which helps to enable the faster broadband connectivity speeds, further, such access nodes are performing additional signal processing locally and operate faster in terms of serving the total bandwidth moving through such devices, all of which exacerbates the problematic demands on computational capabilities of such devices. It is therefore necessary to either to have very expensive processors locally within such access nodes to suitably perform such functionality, or the functionality may be performed remotely by virtualized machines supported by appropriate hardware capabilities, where such functions may be abstracted from the remotely deployed devices and operated on such bare-metal servers or VMs in a different physical location.

Network Functions Virtualization (NFV) is moving the compute processing involved with network functions from such dedicated servers, DSLAMs, DPUs, Access Nodes, and other such network devices into the cloud, as supported by data centers or other Point of Presence (PoP) implementations of computing infrastructure. When it comes to broadband access functions, virtualization is being actively investigated for network components such as the Broadband Network Gateway (BNG)/Broadband Remote Access Server (BRAS), and for the Customer Premises Network (CPE)/Residential Gateway (RG).

The methodologies described herein provide means by which to virtualize such functions, and in particular, functions associated with the Access Node (AN) (e.g., be it a DSLAM, DPU, OLT, CMTS, or Ethernet aggregation switch) as what may be called Virtualized Access Node Functions (VANFs). Such systems, methods, and apparatuses for implementing the virtualization of access node functions as well as the systems, methods, and apparatuses for implementing Persistent Management Agent (PMA) functions for the control and coordination of DPU and DSLAM components have yet to date be considered or addressed in the conventional arts because either they are new or because others have simply assumed that such functions must be located within the remotely deployed access node itself. The means described herein thus take a somewhat contrarian view by abstracting such functions from the ANs deployed into the field and enabling the virtualization and use of such functions at a different location.

Many broadband access network control and management functions currently performed in the access node are nevertheless suitable to virtualization and remote execution from their native equipment (e.g., running such functions at a data center rather than at a field deployed AN). There are likewise many new network functions that may either be performed in an access node locally or be performed via the Virtualized Access Node Functions (VANFs) described herein.

The embodiments described herein specifically provide means and methodologies by which to virtualize specific network functions that are conventionally performed locally at a broadband access node deployed remotely in the field.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Asymmetric Digital Subscriber Line (ADSL) systems (one form of Digital Subscriber Line (DSL) systems), which may or may not include splitters, operate in compliance with the various applicable standards such as ADSL1 (G.992.1), ADSL-Lite (G.992.2), ADSL2 (G.992.3), ADSL2-Lite G.992.4, ADSL2+(G.992.5) and the G.993.x emerging Very-high-speed Digital Subscriber Line or Very-high-bitrate Digital Subscriber Line (VDSL) standards, as well as the G.991.1 and G.991.2 Single-Pair High-speed Digital Subscriber Line (SHDSL) standards, all with and without bonding, and/or the G.997.1 standard (also known as G.ploam).

In accordance with embodiments described herein, end-user consumers, including residential consumers and business consumers, may connect to the Internet by way of a Wide Area Network (WAN) backhaul connection to a Service Provider (SP), such as an Internet Service Provider (ISP), or to a Service Provider that provides one or more of data connectivity, voice connectivity, video connectivity, and mobile device connectivity to a plurality of subscribers. Such Service Providers may include a Digital Subscriber Line (DSL) internet service provider which provides its subscribing end-users with Internet bandwidth at least partially over copper twisted pair telephone lines, such as that conventionally utilized to carry analog telephone service (e.g., Plain Old Telephone Service (POTS); a coaxial cable internet service provider which provides end-users with Internet bandwidth at least partially over coaxial cable, such as that conventionally utilized to carry "cable" television signals; or a fiber optics internet service provider which provides end-users with Internet bandwidth at over fiber optic cable that terminates at a customer's premises. Other variants exist as well, such as ISPs which provide Internet bandwidth as an analog signal over an analog telephone based connection, ISPs that provide Internet bandwidth over a one-way or two-way satellite connection, and ISPs that provide Internet bandwidth at least partially over power lines, such as power lines conventionally utilized to transmit utility power (e.g., electricity) to an end-user's premises, or ISPs that provide Internet bandwidth at least partially over wireless channels, such as wireless (e.g., WiFi) connectivity at hotspots, or mobile data connectivity via technologies and standards such as WiMax, 3G/4G, LTE, etc.

In performing the disclosed functions, systems may utilize a variety of operational data (which includes performance data) that is available at an Access Node (AN).

In FIG. 1, user's terminal equipment 102 (e.g., a Customer Premises Equipment (CPE) device or a remote terminal device, network node, LAN device, etc.) is coupled to a home network 104, which in turn is coupled to a Network Termination (NT) Unit 108. DSL Transceiver Units (TU) are further depicted (e.g., a device that provides modulation on a DSL loop or line). In one embodiment, NT unit 108 includes a TU-R (TU Remote), 122 (for example, a transceiver defined by one of the ADSL or VDSL standards) or any other suitable network termination modem, transceiver or other communication unit. NT unit 108 also includes a Management Entity (ME) 124. Management Entity 124 can be any suitable hardware device, such as a microprocessor, microcontroller, or circuit state machine in firmware or hardware, capable of performing as required by any applicable standards and/or other criteria. Management Entity 124 collects and stores, among other things, operational data in its Management Information Base (MIB), which is a database of information maintained by each ME capable of being accessed via network management protocols such as Simple Network Management Protocol (SNMP), an administration protocol used to gather information from a network device to provide to an administrator console/program or via Transaction Language 1 (TL1) commands, TL1 being a long-established command language used to program responses and commands between telecommunication network elements, or using YANG data models via Network Configuration Protocol (NETCONF), which is a newer language initially defined for software-defined networking and virtualization.

Each TU-R 122 in a system may be coupled with a TU-C (TU Central) in a Central Office (CO) or other central location. TU-C 142 is located at an Access Node (AN) 114 in Central Office 146. A Management Entity 144 likewise maintains an MIB of operational data pertaining to TU-C 142. The Access Node 114 may be coupled to a broadband network 106 or other network, as will be appreciated by those skilled in the art. TU-R 122 and TU-C 142 are coupled together by a loop 112, which in the case of VDSL may be a twisted pair line, such as a telephone line, which may carry other communication services besides DSL based communications.

Several of the interfaces shown in FIG. 1 are used for determining and collecting operational data. The Q interface 126 provides the interface between the Network Management System (NMS) 116 of the operator and ME 144 in Access Node 114. Parameters specified in the G.997.1 standard apply at the Q interface 126. The near-end parameters supported in Management Entity 144 may be derived from TU-C 142, while far-end parameters from TU-R 122 may be derived by either of two interfaces over the UA interface. Indicator bits and EOC messages may be sent using embedded channel 132 and provided at the Physical Medium Dependent (PMD) layer, and may be used to generate the required TU-R 122 parameters in ME 144. Alternately, the Operations, Administration and Maintenance (OAM) channel and a suitable protocol may be used to retrieve the parameters from TU-R 122 when requested by Management Entity 144. Similarly, the far-end parameters from TU-C 142 may be derived by either of two interfaces over the U-interface. Indicator bits and EOC messages provided at the PMD layer may be used to generate the required TU-C 142 parameters in Management Entity 124 of NT unit 108. Alternately, the OAM channel and a suitable protocol may be used to retrieve the parameters from TU-C 142 when requested by Management Entity 124.

At the U interface (also referred to as loop 112), there are two management interfaces, one at TU-C 142 (the U-C interface 157) and one at TU-R 122 (the U-R interface 158). U-C Interface 157 provides TU-C near-end parameters for TU-R 122 to retrieve over the U interface/loop 112. Similarly, U-R interface 158 provides TU-R near-end parameters for TU-C 142 to retrieve over the U interface/loop 112. The parameters that apply may be dependent upon the transceiver standard being used (for example, G.992.1 or G.992.2). The G.997.1 standard specifies an optional Operation, Administration, and Maintenance (OAM) communication channel across the U interface. If this channel is implemented, TU-C and TU-R pairs may use it for transporting physical layer OAM messages. Thus, the TU transceivers 122 and 142 of such a system share various operational data maintained in their respective MIBs. Interfaces V 156 and V-C 159 are further depicted within the CO 146 at different points of the loop 112. Interface G at element 169 is connected between the home network 104 and the Network Termination unit 108

Depicted within FIG. 1 are system(s) 170, for instance, which host or provide a VANF Implementation, and such system(s) 170 may reside at any of multiple optional locations. Moreover, system(s) 170 may constitute a single large system having therein a large collection of computing equipment to implement the methodologies described herein or constitute multiple related and communicably interfaced systems or sub-systems to carry out the described embodiments. In certain embodiments, system(s) 170 embody a data center or reside within a data center which operate in a physical geographic location which is remote and distinct from the network components, access nodes, DSLAMs, DPUs, OLTs, and other such Network Equipment for which functions are abstracted and virtualized elsewhere. According to the depicted embodiment at FIG. 1, the system(s) 170 are shown to operate at various optional locations in accordance with several alternative embodiments. For example, in accordance with one embodiment, system(s) 170 are communicably interfaced through broadband network 106, for instance, through a public Internet, VPN, or other network utilized to reach DSL networking equipment. For instance, system(s) 170 need not be co-located with the DSL network equipment in order to provide abstraction and virtualization of network element functions as well as associated services, and to be sure, such system(s) 170 most often will not be co-located with the network elements and other network components for which the functions are abstracted and virtualized. Such system(s) 170 may therefore operate within the "cloud," for instance, at a remote hosted computing facility or data center within which the system(s) 170 reside, from which such system(s) 170 are connected over potentially long distances via appropriate networking technology to the remotely deployed network equipment. Such a cloud service provider may therefore provide the abstracted and virtualized functions to another entity via the "cloud" as a service for a subscription fee. Or the cloud service provider can provide the computing infrastructure that the functions run on. Such services may be provided to broadband network providers, DSL network operators, DSL network services providers, etc. In alternative embodiments, it is feasible for the system(s) 170 to operate within the Central Office 146 and be communicably interfaced through NMS 116 or system(s) 170 may operate outside of the Central Office 146 and be communicably interfaced either to NT unit 108 or interfaced into the TU-R 122 within NT unit 108.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. For example, Public Switched Telephone Network (PSTN) used to provide DSL services to customer premises are located at, near and/or are associated with the network termination (NT) side of the telephone lines. Example customer premises include a residence or an office building.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a broadband communications service provider offer services that diagnose or improve broadband communications services (DSL, DSL services, cable, etc.).

Additionally, as used herein, the term "DSL" refers to any of a variety and/or variant of DSL technology such as, for example, Asymmetric DSL (ADSL), High-speed DSL (HDSL), Symmetric DSL (SDSL), Very high-speed/Very high-bit-rate DSL (VDSL) and/or Fast Access to Subscriber Terminals (G.fast). Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.9701 for G.fast modems, I.T.U. standard G.994.1 (G.hs) for modems implementing handshake, and/or the I.T.U. G.997.1 (a.k.a. G.ploam) standard for management of DSL modems.

References to connecting a DSL modem and/or a DSL communication service to a customer are made with respect to exemplary Digital Subscriber Line (DSL) equipment, DSL services, DSL systems and/or the use of ordinary twisted-pair copper telephone lines for distribution of DSL services and it shall be understood that the disclosed methods and apparatus to characterize and/or test a transmission medium for communication systems disclosed herein may be applied to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, broadband power-line systems and/or fiber optic networks. Additionally, combinations of these devices, systems and/or networks may also be used. For example, a combination of twisted-pair and coaxial cable interfaced via a balun connector, or any other physical-channel-continuing combination such as an analog fiber to copper connection with linear optical-to-electrical connection at an Optical Network Unit (ONU) may be used.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

Figure 2:
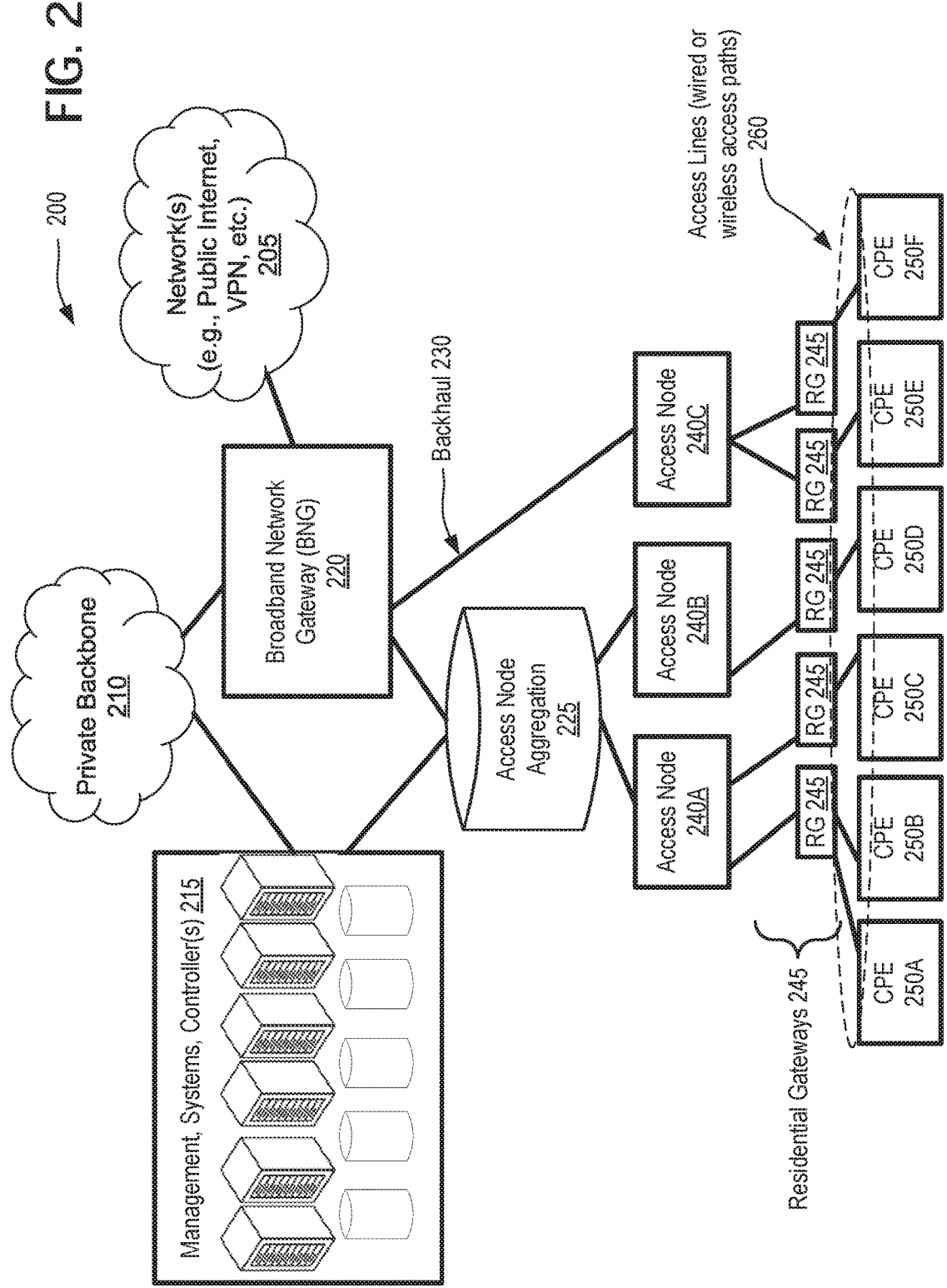
FIG. 2 depicts another exemplary architecture in accordance with described embodiments.

FIG. 2 depicts another exemplary architecture 200 in accordance with described embodiments including how VANFs may be performed on remotely-located compute infrastructure. More particularly, a simplified view of broadband access network elements (NEs) are depicted, beginning with the Customer premises Equipment (CPE) components 250A, 250B, 250C, 250D, 250E, and 250F at the bottom of FIG. 2 depicted as being connected via access lines 260 (e.g., wired or wireless access paths) through one of the depicted residential gateways 245. The Residential Gateway (RG) network components depicted here may themselves be a type of CPE according to the various embodiments. The Residential gateways 245 are connected to the access nodes 240A, 240B, and 240C which in turn connect through access node aggregation 225 devices such as Optical Line Terminals (OLTs) or Ethernet aggregation switches as is depicted with each of Access Nodes 240A and 240B. Alternatively, or additionally as the case may be, the access nodes may connect to other network(s) 205, such as the public Internet, VPNs, or to other private networks through a Broadband Network Gateway (BNG) 220 (sometimes also called a Broadband Remote Access Server (BRAS)) via backhaul 230 as is depicted with access node 240C. Management systems and controller(s) 215 connect to the various Network Elements over any of a variety of connections including via a private backbone 210 as is depicted here.

In the most general sense, the methodologies described herein seek to abstract functions from the access nodes 240A-C, be they DSLAMs, DPUs, OLTs, CMTS devices, etc. For instance, according to particular embodiments, the management, systems, and controller(s) 215 (e.g., which may correspond to the "system(s)" as depicted at element 170 of FIG. 1), may serve as a virtualized computing hardware or infrastructure for functionality abstracted from the access nodes 240A-C, including any function or functionality capable of abstraction from such network elements and corresponding virtualization at the management, systems, and controller(s) 215.

In alternative embodiments, it may prove useful to abstract certain useful access node functions, but not all functions possible of abstraction and corresponding virtualization.

With regard to broadband networking, it may be preferential to abstract functions from the access nodes 240A-C that relate to scheduling and vectoring control as a foundation and then optionally abstract other functions as the need arises for any particular implementation.

Notwithstanding the abstraction and virtualization of functions from the access nodes 240A-C, it is nevertheless mandatory to maintain physical access nodes 240A-C in the field, such as DSLAMs, as it is the physical devices which terminate the broadband lines and provide network connectivity to the broadband lines, regardless of whether such lines are optical, DSL, cable, etc.

According to the depicted embodiment, the management systems and controller(s) 215 receives information from the access nodes 240A-C. Take vectoring for example. Computing vectoring coefficients at the remote machine must have error samples returned back from the access nodes 240A-C which could be averages, or summary information, but must be error information about the broadband lines themselves. Vectoring control at the management systems and controller(s) 215 would then calculate the vectoring coefficients based on the error sample data returned from the access nodes 240A-C and such vectoring coefficients would then be returned back to the access nodes 240A-C which implement the vectoring coefficients on the respective broadband lines.

With regard to scheduling, it may be necessary to know the queue occupancy which may constitute data which resides within the transceiver for the respective access node 240A-C which is connected with a corresponding broadband line. Alternatively, such information may be retrievable from a policy manager or a resource assignment system. Such information could be forced to be returned or pulled from the access nodes 240A-C or pulled through the access nodes 240A-C from the CPE, or the information could be pulled directly from a network management system. Scheduling information need not be real-time data, and as such, various aggregation and data access schemes are often acceptable. The access nodes 240A-C may additionally pull real time operational data regarding the broadband lines in which the management systems and controller(s) 215 will then tell what time slots are assigned on what lines. For instance, line 1 may be identified as using particular time slots, frames, downstream scheduling, upstream scheduling, etc.

Figure 3:
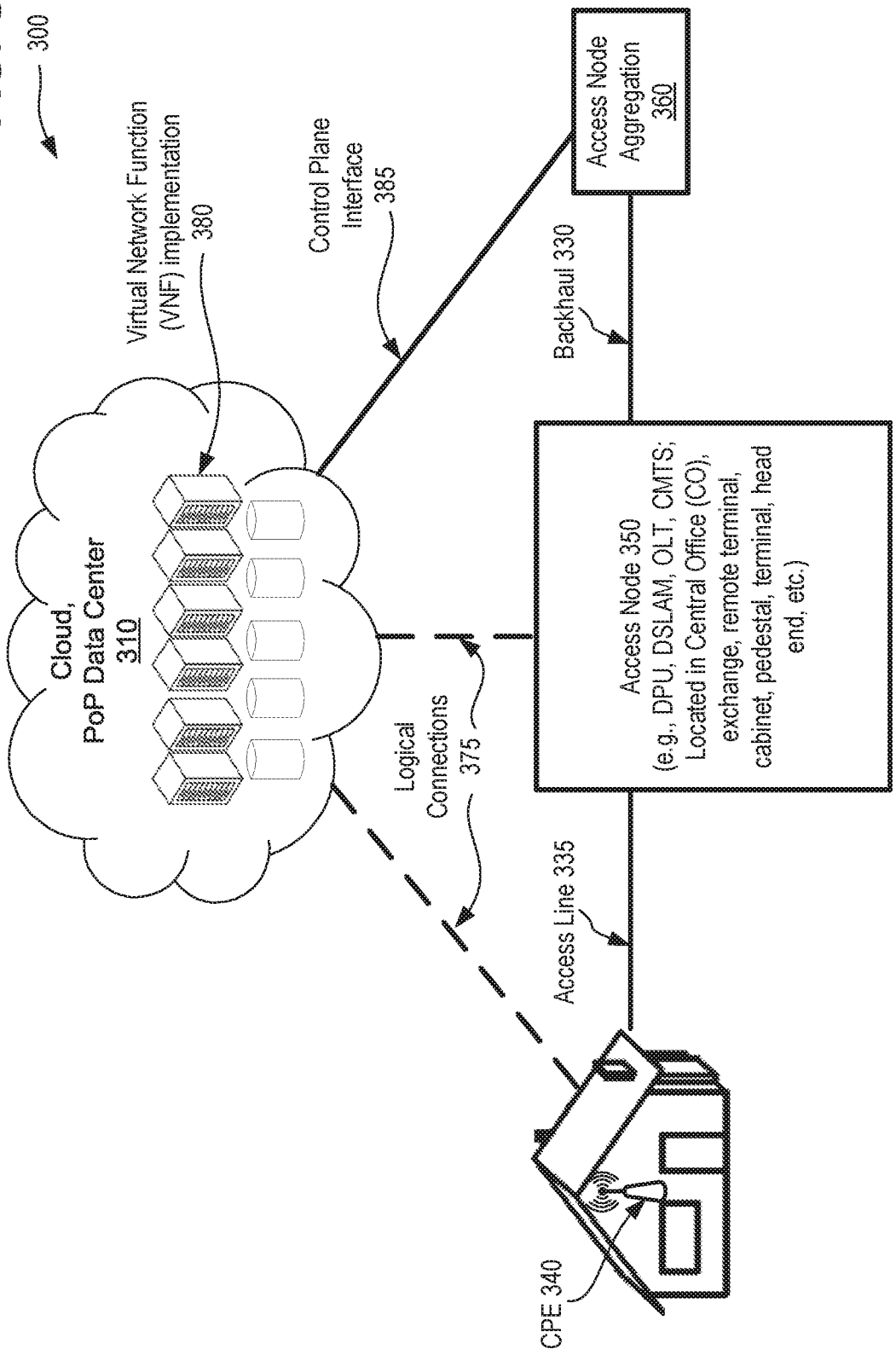
FIG. 3 depicts an alternative exemplary architecture in accordance with described embodiments.

FIG. 3 depicts an alternative exemplary architecture 300 in accordance with described embodiments, and more particularly, depicts connections to the computational resources utilized for virtualization in accordance with certain embodiments. CPEs 340 and access nodes 350 (e.g., DPU, DSLAM, OLT, CMTS; Located in a Central Office (CO), exchange, remote terminal, cabinet, pedestal, terminal, head end, etc.) connect with virtualized compute resources which are remotely located in the cloud, Point-of-presence (PoP), or data center 310 as depicted here. Specifically, the CPE 340 is connected via access line 335 to the access node 350 which is located in the central office (CO), an exchange, a remote terminal, a cabinet, a pedestal, a terminal, a headend, etc., which in turn is connected via a backhaul 330 to the access node aggregation 360 device, and then back to the cloud, PoP, or data center 310. The dashed lines from CPE 340 to the cloud, PoP, or data center 310 and from access node 350 back to the cloud, PoP data center 310 represent logical connections 375.

For instance, a Virtual Network Function (VNF) 380 implemented via the cloud, PoP, or data center 310 may communicate with the access node 350 via a control plane interface 385 which resides between the Virtual Network Function and the access node aggregation 360 device. As depicted, the access node 350 is coupled with broadband lines such as cable broadband lines, optical broadband lines (e.g., fiber), DSL broadband lines, etc., each being represented here as access line 335. The access node 350 returns current operational data and current operating conditions regarding the broadband lines or access line 335 to the Virtual Network Function implemented by the cloud, PoP, or data center 310 over the control plane interface 385.

Virtual Network Function 380 analyzes the returned operational data and operating conditions and then issues instructions to the access node to adopt configurations, adopt configuration parameters or operational parameters, modes, thresholds, etc., adopt or implement calculated coefficients provided by the virtual network function 380, implement scheduling schemes specified by the virtual network function 380, and so forth.

The Access node 350 will then responsively adopt or carry out the instructions provided by the virtual network function 380. In addition to scheduling and configuration means, a Persistent Management Agent (PMA) is also provided such that if the various network elements are powered off, their configuration will nevertheless be maintained and thus persist through the power cycle or extended power off period, thus potentially negating the need for a re-configuration and re-training, or worse yet, extended downtime and network unavailability to the end user.

Figure 4:
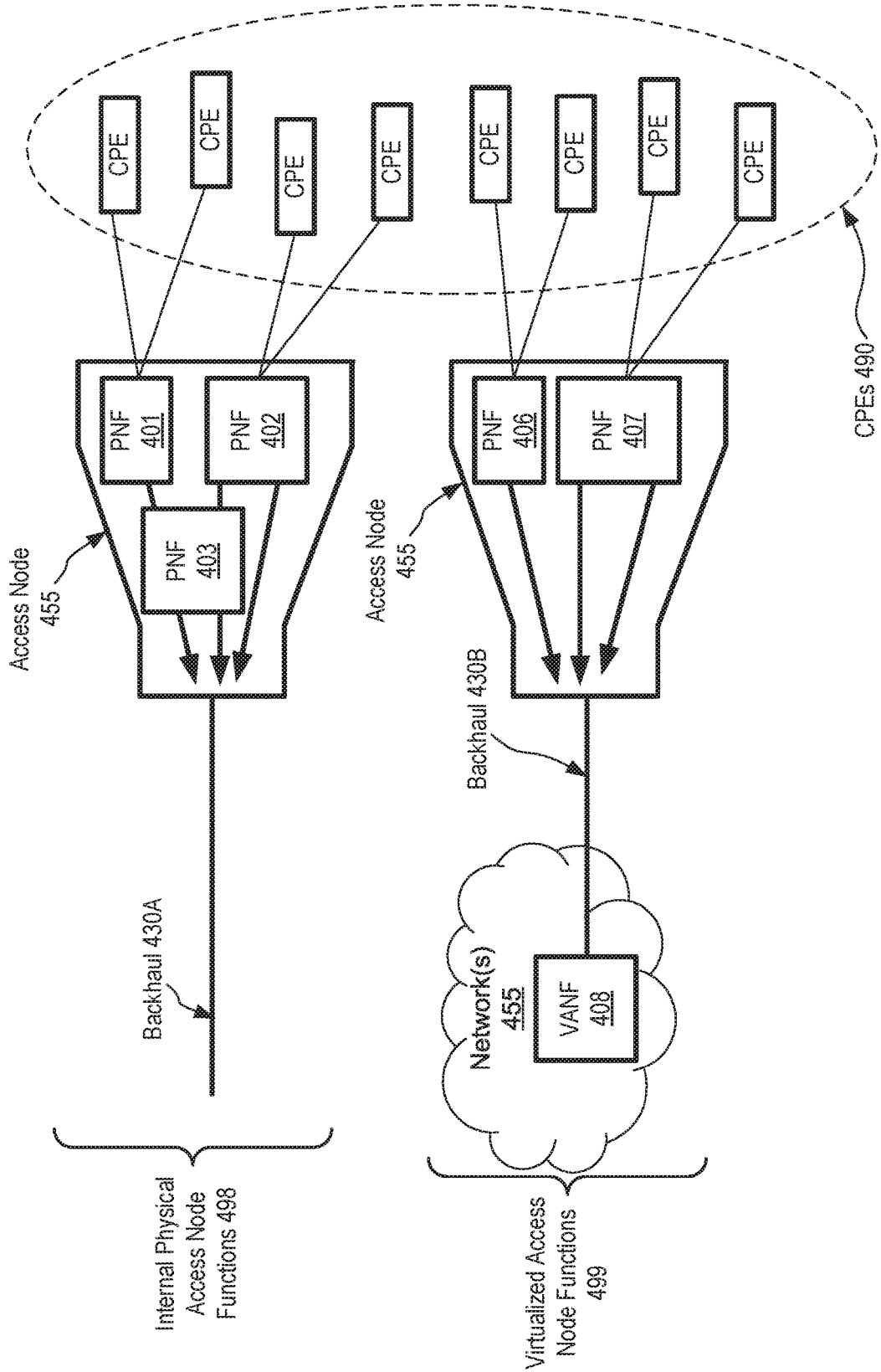
FIG. 4 depicts an alternative exemplary architecture in accordance with described embodiments.

FIG. 4 depicts an alternative exemplary architecture 400 in accordance with described embodiments, and more particularly, an exemplary migration from a Physical Network Function (PNF) to a Virtualized Access Node Function or a Virtualized Network Function (VNF). For instance, there are multiple CPEs 490 depicted, each communicatively interfaced with the various Physical Network Functions (PNF) 401, 402, 406 and 407. In the case of PNF 403, the CPEs 490 are only indirectly connected as PNF 403 is connected to the CPEs through an aggregation of PNF 401 and 402, which are then connected with backhaul 430A, to form the internal physical access node functions 498 depicted. Conversely, the lower portion of the CPEs 490 are connected with PNF 406 and PNF 407 respectively, which in turn are connected via backhaul 430B to the Virtualized Access Node Function (VANF) 408 accessible via network(s) 455, thus constituting the virtualized access node functions 499. In such a way, functions may be migrated, abstracted, etc., from being a physical network function (PNF) such as 406 and 407 internal to an Access Node (AN) 455 to being a Virtualized Access Node Function (VANF) 408.

Virtualized Access Node Functions (VANFs) may be thought of as Physical Network Functions (PNFs) that are moved out of the physical access node, located remotely, and then which are made to communicate with the physical access node. The VANFs can replace or complement Physical Network Functions (PNFs) that physically remain on the physical access node. Such an external VANF can be considered logically to be a part of the access node notwithstanding its remote presence.

A VANF may run or execute upon virtualized infrastructure constructed of hardware and software. This virtualized infrastructure may span across one or several locations, such as locations of different servers, racks, data centers, points-of-presence (PoPs), or a cloud. A physical or virtual network may provide connectivity between these locations. A layer of software running on the hardware infrastructure may provide virtual machines, virtual infrastructure, a virtual platform, virtual software, or other virtual services that create the virtualized infrastructure that the VANF is deployed on, The VANF or VANFs may be controlled by one or more of: a hypervisor, an orchestrator, a Virtualized Network Function Manager, and a Virtualized Infrastructure Manager.

Figure 5:
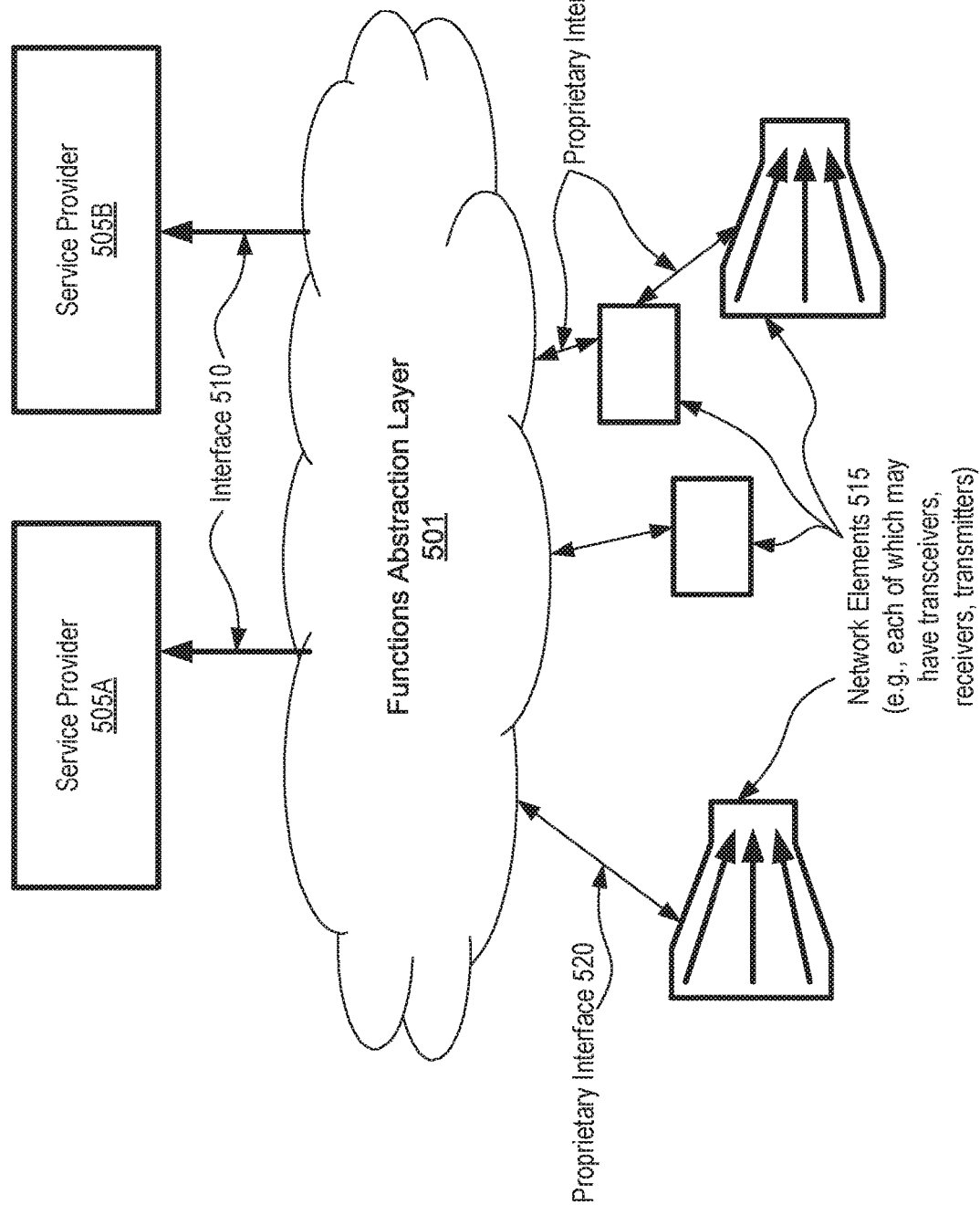
FIG. 5 depicts an alternative exemplary architecture in accordance with described embodiments.

FIG. 5 depicts an alternative exemplary architecture 500 in accordance with described embodiments, and more particularly, depicts the interfacing of virtualized access node functions (e.g., VANFs) with multiple service providers. Depicted here is a functions abstraction layer 501 cable of converting signaling and mediating between service providers 505A and 505B and the requests of such service providers 505A and 505B as well as performing resource allocation amongst them. The service providers 505A and 505B interface 510 through the functions abstraction layer 501 to various network elements 515 through various proprietary or standard interfaces 520 according to the depicted embodiment. Any or all of the depicted network elements 515 Network Elements 515 may include transceivers or receivers and transmitters for communicating data onto the broadband lines. For instance, DPUs, DSLAMs, CPEs, and other access nodes may embody such transceivers or receivers/transmitters for communicating data.

Communication between service providers, VANFs, access nodes, and other systems, devices, or infrastructure may be passed through such a functions abstraction layer 501 which maps between different signaling formats as depicted, all of which may utilize a common interface 510.

In some areas where multiple service providers are present, there may be an infrastructure provider that is in control of the wires, cables, or optical fibers. In such embodiments, there may be one or more access node operators that are in control of the access nodes, and one or more retail service providers which sell the broadband services to end-users. The infrastructure provider and access node operator may additionally exist as one entity, called a "wholesale provider."

VANFs facilitate such multi-provider environments, since the virtualized functions may be used by multiple parties, and because there may be multiple instances of each VANF without conflict. Various functions may or may not be virtualized, and such virtualized functions may or may not be shared by multiple providers. A retailer provider may be able to access VANFs from the wholesale provider and such a retail provider may be able to instantiate a VANF on infrastructure owned by a wholesale provider.

VANFs may support both physical local loop unbundling (LLU) and virtual loop unbundling (VULA). "Super" VULA may likewise be enabled which unbundles VANFs as well as physical infrastructure, and may thus provide a level of unbundling such that a retail provider is enabled to perform operations similar to the way they would with physical unbundling.

Further enabled are various forms of metallic access. Fiber to the Node (FTTN) and Fiber to the distribution point (FTTdp) architectures utilize copper only over the last few hundred or thousand meters from a remote Digital Subscriber Line Access Multiplexer (DSLAM) or Distribution Point Unit (DPU), extending fiber nearly to the customer while avoiding the considerable cost of installing fiber into a customer premises. The remote DSLAM or DPU is a very small, low-power device which needs to be energy efficient. It may therefore be particularly advantageous to virtualize computationally complex control and management functions for FTTdp DPUs which tend to consume more extensive amounts of electric power due to their computationally intensive operations. VANFs can remove powering of some functions from FTTdp DPUs, and can involve power efficiencies by statistical multiplexing functions across multiple lines or multiple groups of transceivers.

Further still, VDSL implementations, which includes VDSL1, VDSL2, and vectored VDSL, is generally used for FTTN and FTTdp deployments. Virtualized Access Node Functions (VANFs) for VDSL may include, by way of example: VDSL Low-Power Mode (LPM) Power Control Entity (PCE) for which there are a number of thresholds and other settings that may be varied to configure VDSL LPM on individual transceivers. Also, VANFs can determine primitives that indicate LPM entry or exit. These settings and primitives may be determined in a virtualized power control entity and communicated to the transceivers. The transceivers may also feedback the LPM state and various test and diagnostics to the virtualized power control entity, all of which offloads processing from the field deployed network elements and thus improves energy consumption as well as providing various other benefits described herein.

VANFs for VDSL may further include control and management of showtime-adaptive virtual noise or autonomous virtual noise. With such techniques, a transceiver retains data about time-varying noise and these data are then used to determine bit-loading. For example, a peak or semi-peak level of noise may be estimated and then the noise estimate used for determining bit-loading may assume this level of noise. Alternatively, the bit-loading, margin, transmit power, or Power Spectrum Density (PSD) may be directly set using the time-varying noise data. These data may also be sent to a virtualized bit-loading/noise estimation function, which then communicates a calculated set of noise estimates, showtime-adaptive virtual noise, threshold settings, or bit-loading back to the field deployed transceiver. One use of such a technique is to maintain stability with crosstalk from lines using Low Power Mode (LPM), other uses include time-varying radio noise and noise from Power-Line Carrier (PLC) systems.

VANFs for VDSL may further include virtualized management of vectoring, which cancels crosstalk. Any of the following management parameters may be communicated from the VANF to the transceivers or Vectoring Control Entity (VCE) to configure vectored VDSL: Vectoring frequency-band control (VECTOR_BAND_CONTROL), FEXT cancellation Line Priorities (FEXT_CANCEL_PRIORITY), FEXT cancellation enabling/disabling (FEXT_CANCEL_ENABLE), Vectoring Mode Enable (VECTORMODE_ENABLE). Further still, transmit power and PSD may be set. The transceivers may also feedback test and diagnostics data, including FEXT coupling (XLIN) to the virtualized vectoring management.

VANF for VDSL may further include virtualized Vectoring Control Entity (VCE). The vector precoder (downstream) or receiver canceller (upstream, multiplies and sums signals on multiple lines by vectoring coefficients to cancel crosstalk). The vectoring coefficients may be computed in such a virtualized VCE VANF. The cancellation itself then occurs using these coefficients in the transceivers, for instance, by instructing the transceivers to adopt the provided coefficients. Vectoring error samples may be transmitted from the transceivers to the virtualized VCE through the network, and then the virtualized VCE communicates vector coefficients back to the transceivers. The vectoring error samples may be averaged, sub-sampled, or both to lower their traffic load on the network. Also, the VANF may rapidly compute, or pre-compute, new coefficients when lines join or leave the vectored group.

Figure 6:
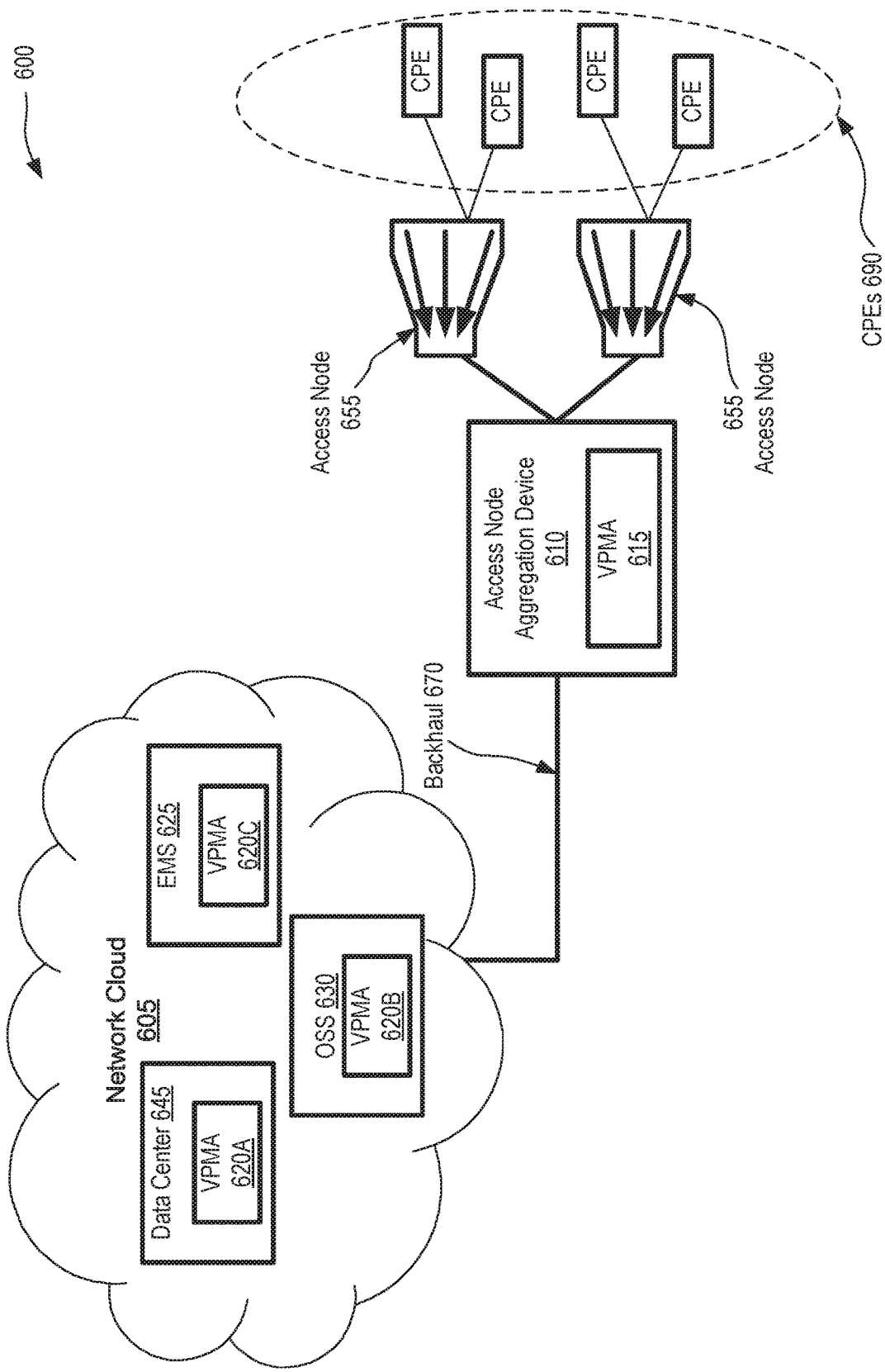
FIG. 6 depicts an alternative exemplary architecture in accordance with described embodiments.

FIG. 6 depicts an alternative exemplary architecture 600 in accordance with described embodiments, and more particularly, depicts implementations of various optional Virtualized Persistent Management Agent (VPMA) locations. Depicted within the network cloud 605 are data center 645 having therein VPMA 620A, Operations Support Systems (OSS) 630 having therein VPMA 620B, and lastly the Element Management System (EMS) 625 having therein VPMA 620C, the network cloud 605 being connected to the access node aggregation device 610 via backhaul 670. The access node aggregation device 610 includes VPMA 615 and the access node aggregation device 610 is communicably interfaced to each of the two access nodes 655 depicted which in turn are connected with CPEs 690.

Further enabled are various forms of metallic access FTTdp and G.fast. FTTdp uses either G.fast or VDSL, or both, for the final transmission over metallic cables. The "DSLAM" equivalent network element in FTTdp implementations is referred to as a "DPU." Regardless, the same VANFs defined for VDSL may apply to G.fast or FTTdp, plus additional functions. For instance, VANFs for G.fast may include traffic scheduling, power management and vectoring as well as the Virtual G.fast Persistent Management Agent (VPMA) elements (e.g., 615 and 620A-C) depicted here.

G.fast traffic, power, and vectoring management are still further enabled in that G.fast uses Time-Division Duplex (TDD) where a given line may be transmitting data, idle, or quiet in each symbol period in each direction of transmission (upstream and downstream). G.fast may implement "discontinuous operation" for power control. With discontinuous operation, the optimal vectoring coefficients and bit-loading change rapidly.

Therefore, G.fast implementations may utilize any of the following interrelated constructs: Dynamic Rate Allocation (DRA) which may change the upstream/downstream asymmetry ratio, and schedule the times in which each line is transmitting data, dummy, idle, or quiet symbols; Power Control Entity (PCE) which controls low-power modes or states; vectoring coefficients which are generally determined by the VCE; and setting the bit-loading of each line which may optionally be controlled from the transmitter. Baseline bit-loading tables may be determined by the virtualized management system. Signal to Noise Ratio (SNR) margin may additionally be varied to indirectly vary bit-loading. The per-subcarrier gains, gi, may similarly be set.

To facilitate transceiver power savings, discontinuous operation may be enabled for G.fast, where not all of the time available for data transmission is used, and where power is saved by turning off transceiver functions the remainder of the time. With discontinuous operation, symbol periods in a logical frame may be filled with either normal data symbols, dummy symbols, idle symbols, or quiet symbols. In such embodiments, a Robust Management Channel (RMC) symbol is considered to operate similar to data symbols, and a pilot symbol is considered to operate as a type of dummy symbol.

Figure 7:
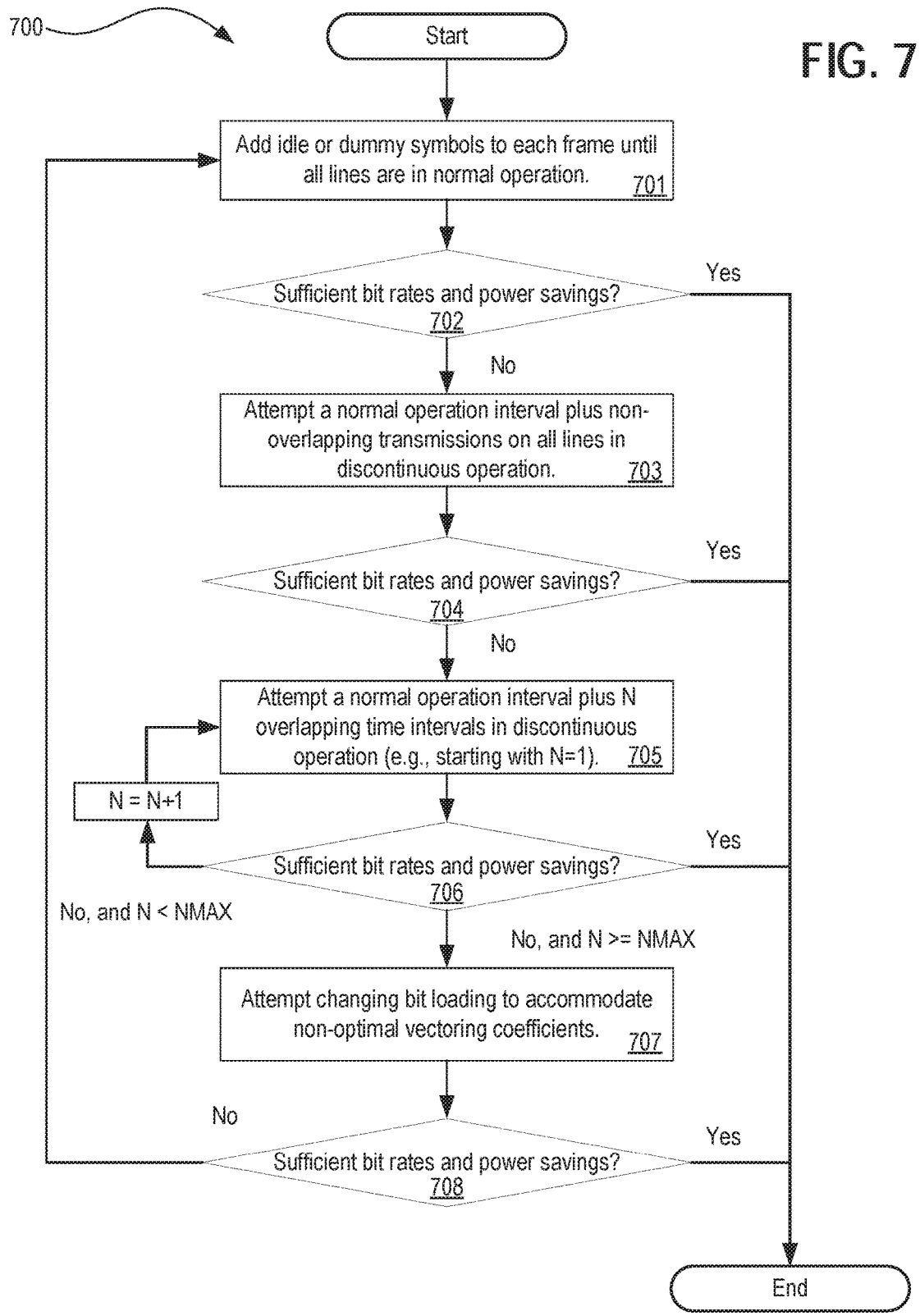
FIG. 7 depicts a flow diagram of a method for implementing a VANF algorithm for traffic, power, and vectoring management.
Figure 8:
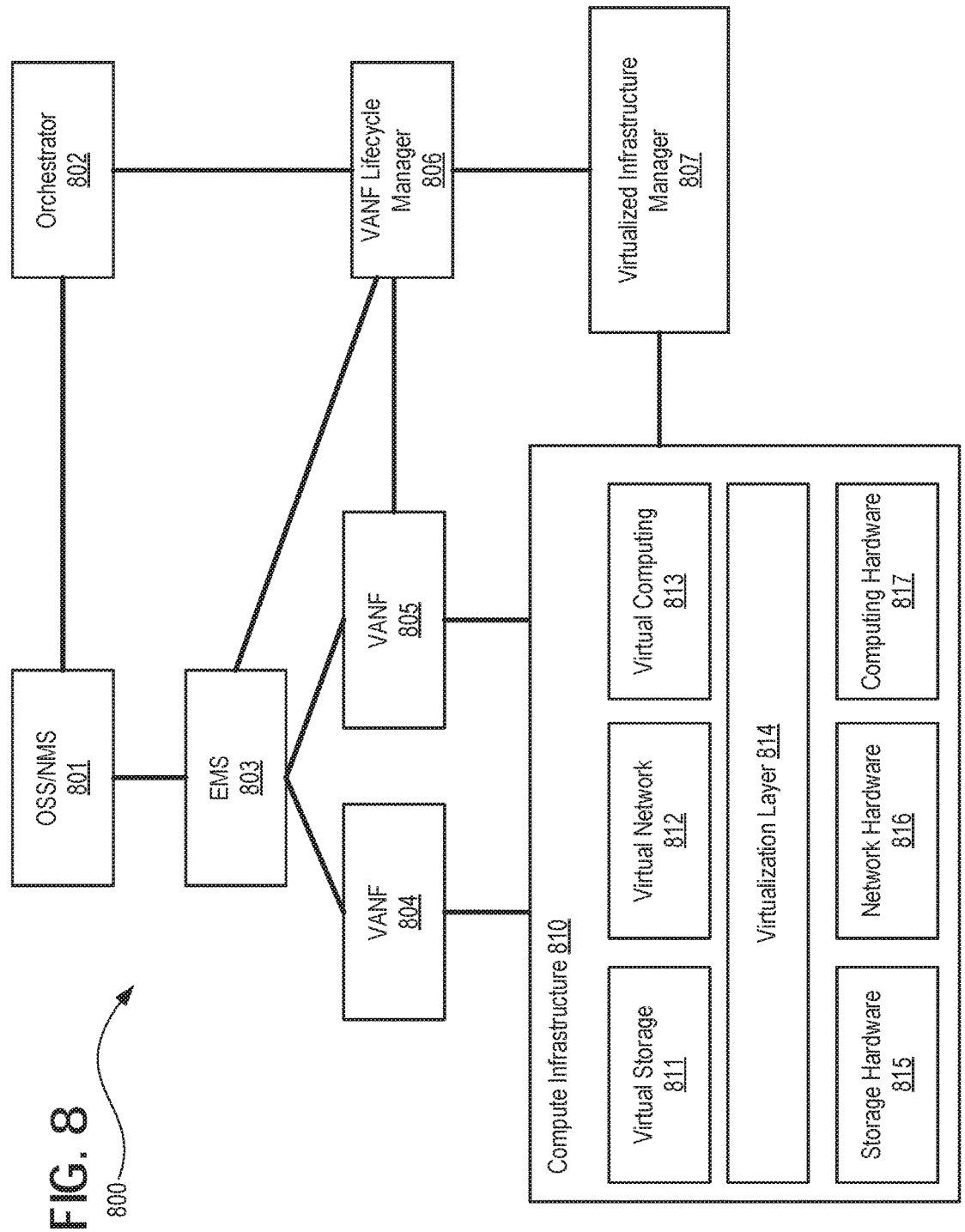
FIG. 8 depicts an alternative exemplary architecture in accordance with described embodiments.

FIG. 7 depicts a flow diagram of a method 700 for implementing a VANF algorithm for traffic, power, and vectoring management. For instance, traffic allocation, vectoring coefficients, bit-loading, bit rates, and power savings are calculated by the VANF at each step in accordance with a particular embodiment. For example, a G.fast discontinuous operation process flow may be performed via the method 700 depicted, including the coordination of G.fast discontinuous operation across multiple lines implemented via a Virtualized Access Node Function (VANF). Method 700 may be performed by processing logic that may include hardware (e.g., circuitry, dedicated logic, programmable logic, microcode, etc.), software (e.g., instructions run on a processing device) to perform various operations such as managing, controlling, analyzing, collecting, generating, monitoring, diagnosing, executing, presenting, receiving, interfacing, communicating, receiving, transmitting, processing, providing, determining, triggering, displaying, retrieving, updating, sending, returning, etc., in pursuance of the systems and methods as described herein. For example, system(s) 170 as depicted at FIG. 1, the Management, Systems, Controller(s) 215 as depicted at FIG. 2, the architecture 800 as depicted at FIG. 8, systems 900 and 1100 at FIGS. 9 and 11 respectively, or the machine 1300 at FIG. 13, may implement the described methodologies. Some of the blocks and/or operations listed below are optional in accordance with certain embodiments. The numbering of the blocks presented is for the sake of clarity and is not intended to prescribe an order of operations in which the various blocks must occur.

As depicted, processing starts and progresses to block 701 where processing logic adds idle or dummy symbols to each frame until all lines are in normal operation. At decision point 702, it is determined whether sufficient bit rates and power savings are attained, and if so, then flow proceeds to the end. Otherwise, flow progresses to block 703 where processing logic attempts a normal operation interval plus non-overlapping transmissions on all lines in discontinuous operation. At decision point 704, it is determined whether sufficient bit rates and power savings are attained, and if so, then flow proceeds to the end. Otherwise, flow progresses to block 705, where processing logic attempts a normal operation interval plus N overlapping time intervals in discontinuous operation (e.g., starting with N=1). At decision point 706, it is determined whether sufficient bit rates and power savings are attained, and if so, then flow proceeds to the end. Otherwise, two options are permissible. If sufficient bit rates and power savings are not attained and N<NMAX (e.g., N is less than the permissible NMAX threshold), then flow increments N and block 705 is re-attempted. Otherwise, if sufficient bit rates and power savings are not attained and N>=NMAX (e.g., N is greater than or equal to the permissible NMAX threshold), then flow instead advances to block 707 where processing logic attempts changing bit-loading to accommodate non-optimal vectoring coefficients. At decision point 708, it is determined whether sufficient bit rates and power savings are attained, and if so, then flow proceeds to the end. Otherwise, processing returns to block 701 where the method 700 may be performed for another iteration.

Notably, the calculations may be performed offline by the VANF without burdening the field deployed access nodes, such that the VANF may identify and submit to the access node a suitable configuration to the field deployed access node for adoption or at least to attempt the new configuration and report back operational data and conditions subsequent to use of the new configuration.

Power management involves complex tradeoffs in delay, vectoring performance, and power usage, and various scenarios may be examined and optimized in a VANF without burdening the field deployed network elements.

Vectoring cancels crosstalk and the optimal vectoring coefficients change when any one or more lines is transmitting or not transmitting. Stated differently, in any symbol period, there is a set of lines that are transmitting data, dummy, or idle symbols; and a set of lines that are quiet. If these sets of lines change, then the optimal vectoring coefficients change. To accommodate this, the vector coefficients may change with any change in the membership of these sets, or the bit-loading and margin may be configured so that the performance impact from using non-optimal vectoring coefficients is acceptable.

As scheduling and vectoring interact, for example, symbols may be scheduled for transmission so that they are in different time slots in each line in discontinuous operation to avoid needing to use vectoring in those time slots.

A G.fast Transmission Unit is referred to as an "FTU," and further still, a Network-end G.fast Transmission Unit is an "FTU-O" where as a Customer-end G.fast Transmission Unit is a FTU-R. When vectoring is enabled with discontinuous operation, both FTU-O and FTU-R support a separate baseline bit-loading table for each of the intervals, such as a bit-loading table for normal operation interval and a bit-loading table for the discontinuous operation interval. The baseline bit-loading table may be changed by sending Embedded Operations Channel (EOC) commands across the G.fast line. Transmitter-initiated gain adjustment (TIGA) may be used to change the active bit-loading and gain compensation factor at the remote unit (FTU-R). Using these mechanisms, the DRA function may control the configuration of the active bit-loading table and gains table.

Performance, throughput, and power usage all vary in a complex set of dependencies of these. For example, a line may suddenly have very little traffic to send, then the DRA may set the line to send quiet symbols (be "off") for most of the TDD frame. To satisfy traffic demand on other lines, the DRA may then change transmission opportunity allocations of other lines and even vary the upstream/downstream asymmetry ratio. The VCE may then need to change vectoring precoder coefficients, and to make this implementable it may then change some of the quiet symbols to be idle symbols that transmit vectoring cancellation signals. This then impacts the power usage and may further interact with the DRA. All of these considerations apply to both upstream and downstream.

The results of these interactions are not intuitive, but they may be analyzed offline, with optimal or improved settings selected, and communicated to the DPU and transceivers for adoption. A VANF spanning DRA, PCE, and VCE functions may run through a series of candidate configurations for each situation, calculate the resulting performances, and power usage, and select a good trade-off. These trade-offs may be iteratively optimized. The desired tradeoffs may be selected by the operator or provider, and configured through the virtual management engine. These calculations may be prohibitively complex to be performed in a field deployed network element, yet may readily be computed within the compute infrastructure of a data center supporting such field deployed network elements via VANF.

Referring back to FIG. 6, Virtual G.fast Persistent Management Agent (VPMA) may virtualize the "Persistent Management Agent (PMA)" so as to store configuration and diagnostics data for a DPU and provide access to such information even when the DPU is powered down due to lack of all power from Reverse Power Feed (RPF), or other operating conditions which interrupt the field deployed DPUs ability to maintain its own configuration. The persistence of the PMA also makes it useful for performing a number of related management functions. The PMA can also accept configuration changes from management systems when the DPU is not powered.

Conventional solutions which provide PMA capabilities embed PMA into the network elements themselves, however, the PMA may be abstracted and then virtualized into a virtualized PMA (VPMA), which is itself another type of VANF. Some PMA functions may be virtualized and be VANFs, and some PMA functions may remain as physical network functions (PNF). The VPMA fundamentally differs from a PMA in that it may access a great amount of computing resources and in doing so provide a greater depth of functionality.

VPMA functions may be located in various locations as shown in FIG. 6. The VPMA functions may be a virtualized part of an EMS 625 or Element Management Function (EMF), an Operation Support System (OSS) 630 or Network Management System (NMS) or the VPMA may operate as a stand-alone VNF.

VPMA functions for FTTdp and G.fast may thus include any of: persistent storage of DPU configuration settings and diagnostics information, which may be accessed even when the DPU is powered down; and permitting the VPMA settings to be changed by other management systems when the DPU is powered down and then communicated to the DPU when it powers back up. Additionally, other management systems may read diagnostics data from the VPMA when the DPU is powered down. VPMA functions for FTTdp and G.fast may further include control and management of reverse power feed (RPF) including interpretation by the VPMA of dying gasp messages from the DPU or the transceivers, where the dying gasp may indicate different reasons for power-down (e.g., customer switched off modem, a wire fault, a mains power failure, etc.).

VPMA functions for FTTdp and G.fast may further include so called "Zero Touch" Operations, Administration and Management (OAM) configuration, where connections to new subscribers may be made automatically instead of being done by a technician. The VPMA controls connections from the DPU to the subscribers and such subscribers may be connected to transceiver ports directly, or they may be connected to a switch matrix which connects a line to a transceiver port when a subscriber requests service.

VPMA functions for FTTdp and G.fast may further include management of G.fast low power modes (LPM), using cross-layer data and control. Indications from higher-layers of sessions, resource allocation, traffic levels, queue occupancy, etc., provide data that is used by analyses in the VPMA to determine if G.fast should be in LPM, what type of LPM to use, and what LPM configuration settings to use. Also, the G.fast LPM configuration data may then be returned back to the higher layers functions such as resource allocation and policy management.

In addition to the VPMA functions for FTTdp and G.fast, the VPMA may subsume functions listed previously for VDSL; including DRA, power control, vectoring control, bit-loading, and gains.

FIG. 8 depicts an alternative exemplary architecture 800 in accordance with described embodiments, and more particularly, depicts an exemplary internal architecture 800 of the Virtualized Access Node Functions (VANFs), including infrastructure management and orchestration. The OSS/NMS 801 provide the operational support system and network management system functions respectively. Orchestrator 802 controls the interactions between the virtualization functions and additionally manages network services across a provider's domain and orchestrates resource and usage co-existence across multiple VNF instances.

EMS 803 provides the element management system; VANF 804 and 805 provide the Virtualized Access Node Functions. VANF lifecycle manager 806 manages VANFs, including: VANF instantiation, termination, configuration of resources, VANF updates, performance, and coordination with EMS. Virtualized infrastructure manager 807 controls and manages the compute, storage, and network resources within the compute infrastructure 810 depicted separately.

Within the compute infrastructure 810 there is depicted virtual storage 811, virtual network 812, virtual computing 813, a virtualization layer 814, all of which is supported by the hardware of the compute infrastructure 810, including storage hardware 815, network hardware 816, and computing hardware 817.

For instance, a VANF 804 or 805 may utilize such an algorithm or method 700 as is depicted at FIG. 7 to run through many "what if" scenarios and identify an acceptable or optimal operating point or a set of operating parameters. Traffic allocation, vectoring coefficients, bit-loading, gains, bit rates, and power savings of each line are calculated by the VANF 804 or 805 at each step without incurring computational burden for the field deployed access node, and potentially performing processing which is not only burdensome to the field deployed access node, but in many instances is beyond the computing capabilities of such an access node. The output of the algorithm or method 700 determines the configuration to be used by the access node, DPU, Dynamic Rate Allocation (DRA), or Vectoring Control Entity (VCE).

Other variants of the algorithm described may be performed by the VANF 804 or 805 to determine the allocation of time slots, transmissions, vectoring, bit-loading, and gains. Given a number N of overlapping time intervals, there may likewise be a search across different possible times of the overlapping and non-overlapping time intervals and there may be a non-overlapping time interval as well as partially-overlapping time intervals. Further still, different stopping criteria may be utilized rather than those expressly set forth by the method 700.

Other broadband functions that may be part of VANFs 804 and 805 include any of the following extensions, such as services differentiation, allocation of Quality of Service (QoS) and Class of Service (CoS) levels; Dynamic Spectrum Management (DSM), and control and management of broadband access by the consumer using apps or software agents.

VANFs 804 and 805 may be centrally implemented on a single infrastructure or implemented in a distributed fashion across disparate infrastructure.

The BNG/BRAS (e.g., refer to element 220 at FIG. 2) and the CPE (e.g., any of 250A-F at FIG. 2), may also perform broadband access network control and management which may be virtualized in conjunction with VANFs.

Service chaining, using multiple chained or in parallel VANFs and Virtualized Network Function Components (VNFC). Such service chaining may be controlled by an orchestrator 802 or equivalent orchestration function. For example, a first VANF 804 or 805 may input diagnostics data; a second VANF 804 or 805 analyzes this data; and then a third VANF uses the analysis results to reconfigure an access node, system, line, or transceiver.

VANFs 804 or 805 may work in conjunction with Software-Defined Networking (SDN) controllers.

VANFs 804 or 805 may also involve related functions, systems, and interfaces; such as inventory, plant records, OSS-EMS interfaces, and business-to-business interfaces.

Passive Optical Networks (PON) terminate many access lines on an Optical Line Terminal (OLT). The OLT is central in performing many layer 2 functions such as scheduling, implementing policy, assigning bit rates, and traffic allocations. Determination of Dynamic Bandwidth Allocation (DBA), time slot assignments, and wavelength assignments may be virtualized. Fiber diagnostics may also be virtualized. Other multi-line functions are currently physical functions in the OLT. Many such optical access functions may be virtualized and become VANFs.

Cable Modem Termination Systems (CMTS) terminate many cable modem lines. The CMTS performs many functions such as scheduling, implementing policy, assigning bit rates, and traffic allocations. The CMTS is also central to functions among multiple lines. Radio Frequency (RF) channel assignments and multi-channel bonding control, and diagnostics related to RF or fiber performance may be virtualized. Many such cable-based functions may be virtualized and become VANFs.

Regardless of the type of broadband line or particular physical media; test, diagnostics, monitoring and troubleshooting analyses may be virtualized. Large-scale computing resources and databases storing long-term history in data centers or the cloud may perform deep analyses well beyond what is computationally feasible via the field deployed access nodes themselves. These may input monitoring data, test data, performance data, diagnostics data, and line or equipment status data. The inputs are analyzed by the VANF 804 or 805 to spot faults, identify poor performance, monitor Quality of Service (QoS), monitor Quality of Experience (QoE), issue alarms, determine root cause, assist in troubleshooting, and sometimes also recommend remediation actions. VANF analysis outputs may be used for off line monitoring or real-time test.

The VANF 804 or 805 may react to perform diagnostics, analyses, or reconfigurations in response to inputs from other systems or persons. A consumer may provide feedback indicating their customer satisfaction or their experience with their service quality which then triggers actions in a VANF. The consumer's feedback may be directly provided to a VANF 804 or 805, or the feedback may be analyzed by further systems or VANFs 804 or 805. This may result in generating remediation instructions, or generating a trouble ticket to notify another system, or it may result in a VANF re-configuring an access node, line, or transceiver. Such customer feedback may be input to a VANF one time, or multiple repeating times. Similarly, a service provider or monitoring system may estimate customer satisfaction and input this estimate to a VANF to trigger further actions.

Figure 9:
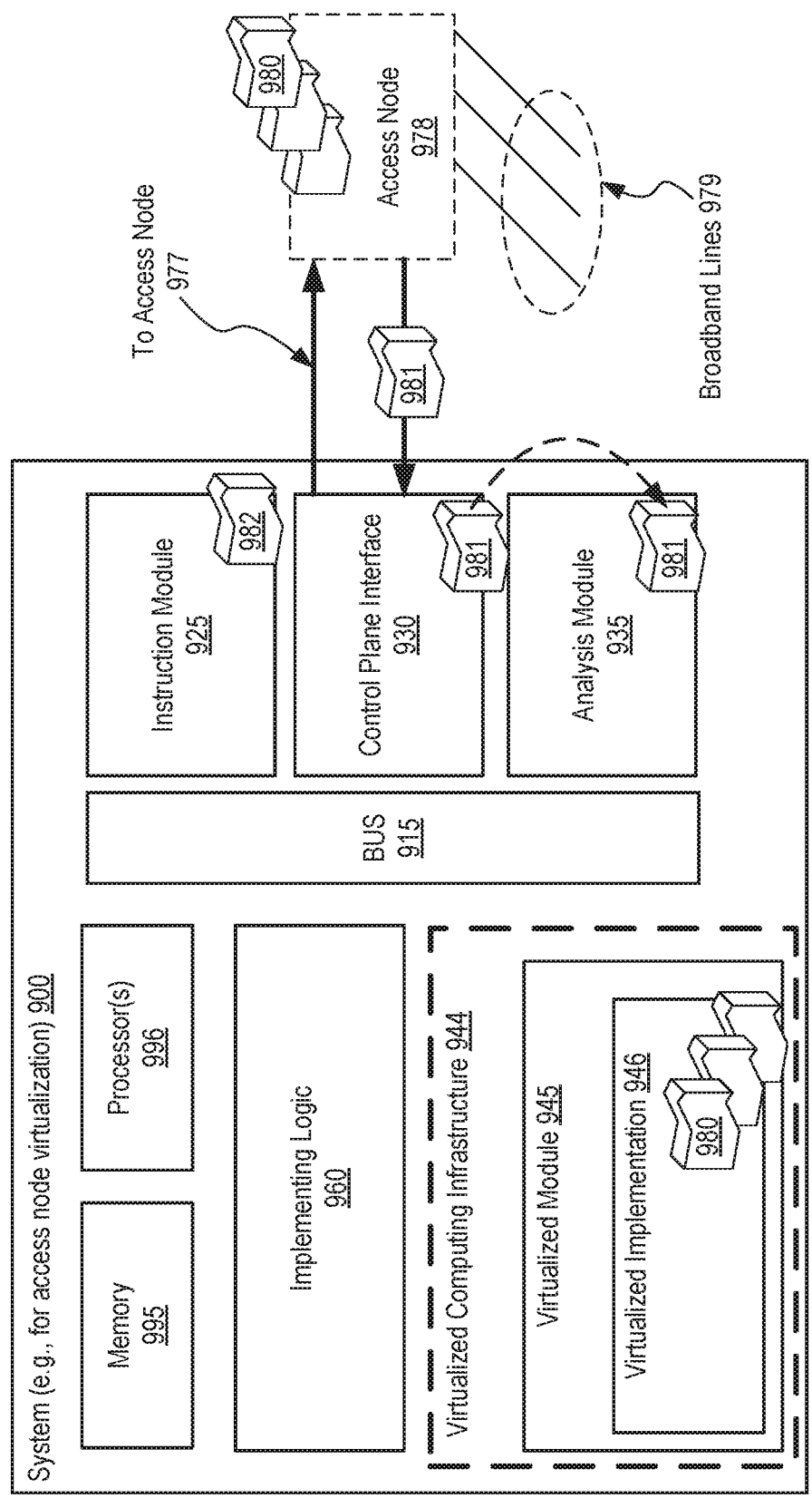
FIG. 9 illustrates a diagrammatic representation of a system in accordance with which embodiments may operate, be installed, integrated, or configured.

FIG. 9 illustrates a diagrammatic representation of a system 900 (e.g., for access node virtualization) in accordance with which embodiments may operate, be installed, integrated, or configured.

In accordance with one embodiment, there is a system 900 having at least a processor 996 and a memory 995 therein to execute implementing logic and/or instructions 960. Such a system 900 may communicatively interface with and cooperatively execute with the benefit of a hosted computing environment, such as an on-demand service provider, a cloud based service provider, or any entity which operates remotely from the network elements having functions being abstracted and virtualized by the remote system, in which the network elements are communicably interfaced over a network, such as a public Internet.

According to the depicted embodiment, system 900 further includes a control plane interface 930 to communicably interface the system with an access node 978 over a network (see element 977 to access node), in which the access node 978 is physically coupled with a plurality of broadband lines 979. Such a system 900 further includes a virtualized module 945 to provide a virtualized implementation 946 of a plurality of functions 980 of the access node 978 at the system 900, in which the virtualized module 945 executes on a virtualized computing infrastructure 944; in which the control plane interface 930 of the system 900 is to receive current operational data and current operating conditions 981 for the plurality of broadband lines 979 from the access node 978; and in which the virtualized module 945 is to update the virtualized implementations 946 of the plurality of functions 980 of the access node 978 at the system 900 according to the current operational data and the current operating conditions 981 received from the access node 978. Such a system 900 further includes an analysis module 935 to analyze the current operational data and the current operating conditions 981 received from the access node 978 and an instruction module 925 to generate control parameters 982 to affect operation of the access node 978 based on the analysis of the current operational data and the current operating conditions 981 received; and further in which the control plane interface 930 is to send the control parameters 982 to the access node for adoption at the access node 978.

Network Functions Virtualization Infrastructure (NFVI) provides alternative means by which to implement the virtualized computing infrastructure 944 of the system 900. Regardless, Virtualized Network Functions (VNFs) execute upon the virtualized computing infrastructure 944 of the system 900 remote from the access nodes 978 from where the respective functions 980 originate. For instance, a virtualized view of the computing resources of the access node 978 is made available locally at the system 900, pulled in by the virtualized module 945.

In accordance with another embodiment of system 900, the virtualized module includes a Virtualized Network Function (VNF) module running on a Network Functions Virtualization Infrastructure (NFVI), and controlled by one or more of a Virtualized Network Function Manager (VNFM); and a Network Function Virtualization Orchestrator (NFVO).

In accordance with another embodiment of system 900, the control plane interface to send the control parameters to the access node for adoption at the access node includes the control plane interface to instruct the access node to adopt the control parameters sent as a new operating configuration.

In accordance with another embodiment of system 900, the access node embodies one of: a Digital Subscriber Line Access Multiplexer (DSLAM); a Distribution Point Unit (DPU); an Optical Line Terminal (OLT); and a Cable Modem Termination System (CMTS).

In accordance with another embodiment of system 900, the system embodies Virtualized Network Function (VNF) server functionality physically remote from the access node and in communication with the access node via the network.

In accordance with another embodiment of system 900, the VNF server functionality is implemented by a third party service provider different than a broadband Internet operator that owns and is responsible for networking equipment to operate the plurality of broadband lines and different than a broadband services provider responsible for providing broadband communication services to broadband service customers; and in which the VNF server communicably interfaces to the access node over a public or private Internet through broadband networking elements of the broadband system operator or the broadband services provider.

Such a broadband services provider may be a provider of DSL, cable, broadband, fiber access, or G.fast, type broadband services, etc.

In accordance with another embodiment of system 900, the third party service provider provides network virtualization services for the access node and the plurality of DSL lines within a DSL network as a subscription based cloud service.

In accordance with another embodiment of system 900, the plurality of broadband lines include a plurality of Digital Subscriber Lines (DSL lines) of a DSL network.

In accordance with another embodiment of system 900, the virtualized module is to virtualize functions of a broadband access node by defining one or more external interfaces the functions as they correspond to the broadband access node's functions, in which the defined one or more external interfaces and the functions are to be deployed into a virtualized infrastructure within which the system operates.

In accordance with another embodiment of system 900, virtualized module virtualizes functions of a broadband access node, the functions being selected from the group including: a Persistent Management Agent (PMA) function; a Dynamic Rate Allocation (DRA) function; a Power Control Entity (PCE) function; a Vectoring Control Entity (VCE) function; a managing Remote Power Feed (RPF) function; a derived telephony management function; a zero-touch Operations, Administration, and Management (OAM) function; Class of Service (CoS) assignment functions; Quality of Service (QoS) monitoring functions; one or more functions to support, interpret, and handle dying gasp messages from transceivers; one or more functions to perform Dynamic Spectrum Management (DSM); one or more functions to implement control of a baseline bit-loading table; one or more functions to implement control of an active bit-loading table; one or more functions to implement control of sub-carrier gains; one or more functions to implement control of a bit rates and SNR margins; one or more functions to support consumer specified, provided, or managed applications that are to execute locally within the system or execute remotely from the system and interface back to the system; and one or more functions to perform diagnostics.

In accordance with another embodiment of system 900, the virtualized module virtualizes functions for one or more of: an Asymmetric Digital Subscriber Line (ADSL) implementation; an ADSL1 implementation; an ADSL2 implementation; an ADSL2plus implementation; a Very high speed Digital Subscriber Line (VDSL) implementation; a VDSL1 implementation; a VDSL2 implementation; a vectored VDSL implementation; a G.fast implementation; a Fiber to the Node (FTTN) implementation; a Fiber to the Distribution Point (FTTdp) implementation; a Passive Optic Networks (PON) implementation; a Gigabit PON (GPON) implementation; a Next-Generation PON (NGPON) implementation; a 10-Gigabit capable PON (XG-PON) implementation; a Ethernet PON (EPON) implementation; a 10 Gigabit PON (10GEPON) implementation; a point-to-point Ethernet on fiber implementation; and a Cable Modem Termination System (CMTS) implementation.

In accordance with another embodiment of system 900, the virtualized module virtualizes functions for a network of Very high speed Digital Subscriber Lines (VDSL); and in which the virtualized module performs one or more of: (i) power management and control of low-power link states for the network of VDSL lines, (ii) Control and management of showtime-adaptive virtual noise or autonomous virtual noise on the network of VDSL lines, (iii) Vectoring management on the network of VDSL lines, and (iv) Vectoring Control Entity (VCE) for the network of VDSL lines.

In accordance with another embodiment of system 900, the virtualized module virtualizes functions for at least one of: managing traffic; managing power; vectoring for G.fast; and determination over multiple of the broadband lines via one or more of: Dynamic Rate Allocation (DRA), discontinuous operation, power control, vectoring control, baseline bit-loading tables, active bit-loading tables, per sub-carrier gains, and Transmitter-Initiated Gain Adjustment (TIGA).

In accordance with another embodiment of system 900, the virtualized module implements a Virtual Persistent Management Agent or a Virtual G.fast Persistent Management Agent to persistently store diagnostics, to persistently store configuration information, to control and manage reverse power feed (RPF) information, to control connections from a Distribution Point Unit (DPU) to subscribers connected with the broadband lines, and/or to manage G.fast Low Power Modes (LPMs).

In accordance with another embodiment of system 900, the virtualized module virtualizes functions for a Passive Optical Network (PON) or an Optical Line Terminal (OLT), in which the virtualized functions of the PON or the OLT are to perform one or more of: Dynamic Bandwidth Allocation (DBA); Time-slot allocation and scheduling for different users and different traffic types; and wavelength assignments in Wavelength-Division Multiplexed (WDM) implementations or hybrid WDM/time-division PON implementations.

In accordance with another embodiment of system 900, the virtualized module virtualizes functions for a Cable Modem Termination System (CMTS), in which the virtualized functions of the CMTS are to perform one or more of: time-slot allocation; time-slot scheduling; time-slot traffic management; radio Frequency (RF) channel assignment; control of Quadrature Amplitude Modulation (QAM); and control of channel bonding.

In accordance with another embodiment of system 900, the virtualized module virtualizes interfaces that enable Virtual Unbundled Loop Access (VULA).

In accordance with another embodiment of system 900, the analysis module 935 is to analyze one or more of test parameters, performance monitoring parameters, diagnostics parameters, and status parameters; and in which the analysis module is to further monitor Quality of Service (QoS), monitor Quality of Experience (QoE), monitor issuing alarms, analyze inputs to determine root cause and inform troubleshooting operations via analysis output.

In accordance with another embodiment of system 900, the analysis module is to analyze input diagnostics or analyses output and responsively generate at least one of: a recommend remediation or corrective action; a trouble ticket; a reconfiguration for the access node; a line reconfiguration; and a transceiver re-configuration.

In accordance with another embodiment of system 900, the control plane interface to send the control parameters to the access node for adoption at the access node includes the control plane of the system to interact with at least one of: a Physical Network Function (PNF); a Broadband Network Gateway (BNG); a Broadband Remote Access Server (BRAS); a Customer Premises Equipment (CPE); a Residential Gateways (RGs); a Software-Defined Networking (SDN) controller; one or more Management systems; one or more Operations Support Systems (OSS); one or more Business Support Systems (BSS); and one or more Element Management Systems (EMS).

In accordance with another embodiment of system 900, the virtualized module provides the virtualized implementation of the plurality of functions of the access node within a virtual machine to execute on the system, in which the virtual machine is to be backed up onto persistent storage as an archive, and in which the virtual machine is redistributable to other systems capable of executing the virtualized implementation of the plurality of functions of the access node.

In accordance with another embodiment of system 900, the virtualized module provides the virtualized implementation of the plurality of functions of the access node either centralized within a single infrastructure or distributed across disparate infrastructure.

In accordance with another embodiment of system 900, the virtualized module provides the virtualized implementation of the plurality of functions of the access node via service chaining with either multiple chained Virtualized Network Function Components (VNFCs) or within parallel VNFCs, the VNFCs being controlled by an orchestration function exposed at the system.

In accordance with another embodiment of system 900, the virtualized module is to perform reconfigurations responsive to an input having a measure of consumer satisfaction therein, the measure of consumer satisfaction constituting one or more of: consumer input; an estimate of consumer satisfaction determined by a monitoring system; an estimate of consumer satisfaction determined by a service quality management system; and an estimate of consumer satisfaction provided by a service provider.

In one embodiment, system 900 includes communication bus(es) 915 to transfer transactions, instructions, requests, test results, analysis, current operating conditions, diagnostics inputs and outputs, outgoing instructions and configuration parameters, and other data within system 900 among a plurality of peripheral devices communicably interfaced with one or more communication buses 915. The control plane interface 930 of system 900 may further receive requests, return responses, and otherwise interface with network elements located separately from system 900.

In some embodiments, control plane interface 930 communicates information via an out-of-band connection separate from DSL line based communications, where "in-band" communications are communications that traverse the same communication means as payload data (e.g., content) being exchanged between networked devices and where "out-of-band" communications are communications that traverse an isolated communication means, separate from the mechanism for communicating the payload data. An out-of-band connection may serve as a redundant or backup interface over which to communicate control data between the system 900 and other networked devices or between the system 900 and a third party service provider. For example, control plane interface 930 may provide a means by which to communicate with system 900 to provide or receive management and control related functions and information.

Figure 10:
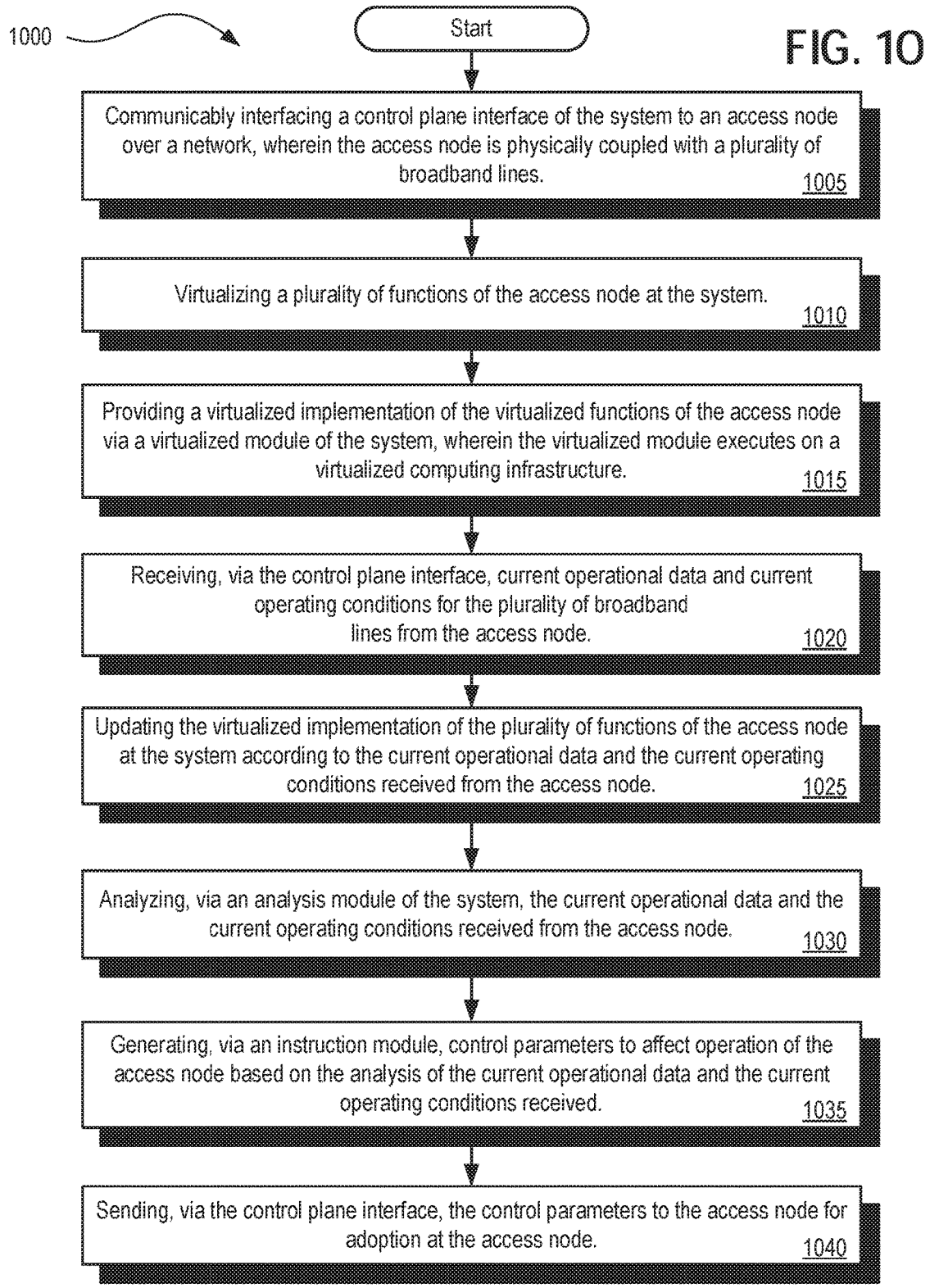
FIG. 10 depicts a flow diagram of a method for implementing the virtualization of access node functions.

FIG. 10 depicts a flow diagram of a method 1000 for implementing the virtualization of access node functions. Method 1000 may be performed by processing logic that may include hardware (e.g., circuitry, dedicated logic, programmable logic, microcode, etc.), software (e.g., instructions run on a processing device) to perform various operations such as managing, controlling, analyzing, collecting, generating, monitoring, diagnosing, executing, presenting, receiving, communicably interfacing, virtualizing, updating, analyzing, sending, communicating, receiving, transmitting, processing, providing, determining, triggering, displaying, retrieving, returning, etc., in pursuance of the systems and methods as described herein. For example, system(s) 170 as depicted at FIG. 1, the Management, Systems, Controller(s) 215 as depicted at FIG. 2, the architecture 800 as depicted at FIG. 8, systems 900 and 1100 at FIGS. 9 and 11 respectively, or the machine 1300 at FIG. 13, may implement the described methodologies. Some of the blocks and/or operations listed below are optional in accordance with certain embodiments. The numbering of the blocks presented is for the sake of clarity and is not intended to prescribe an order of operations in which the various blocks must occur.

Method 1000 begins at block 1005 with processing logic for communicably interfacing a control plane interface of the system to an access node over a network, in which the access node is physically coupled with a plurality of broadband lines.

At block 1010, processing logic virtualizes a plurality of functions of the access node at the system.

At block 1015, processing logic provides a virtualized implementation of the virtualized functions of the access node via a virtualized module of the system, in which the virtualized module executes on a virtualized computing infrastructure.

At block 1020, processing logic receives, via the control plane interface, current operational data and current operating conditions for the plurality of broadband lines from the access node.

At block 1025, processing logic updates the virtualized implementation of the plurality of functions of the access node at the system according to the current operational data and the current operating conditions received from the access node.

At block 1030, processing logic analyzes, via an analysis module of the system, the current operational data and the current operating conditions received from the access node.

At block 1035, processing logic generates, via an instruction module, control parameters to affect operation of the access node based on the analysis of the current operational data and the current operating conditions received.

At block 1040, processing logic sends, via the control plane interface, the control parameters to the access node for adoption at the access node.

According to another embodiment of method 1000, the virtualized module includes a Virtualized Network Function (VNF) module running on a Network Functions Virtualization Infrastructure (NFVI), and controlled by one or more of a Virtualized Network Function Manager (VNFM); and a Network Function Virtualization Orchestrator (NFVO).

According to a particular embodiment, there is non-transitory computer readable storage media, having instructions stored thereupon that, when executed by one or more processors and memory of a virtualized cloud computing infrastructure, the instructions cause the system to perform operations including: communicably interfacing a control plane interface of the system to an access node over a network, in which the access node is physically coupled with a plurality of broadband lines; virtualizing a plurality of functions of the access node at the system; providing a virtualized implementation of the virtualized functions of the access node via a virtualized module of the system, in which the virtualized module executes on the virtualized cloud computing infrastructure; receiving, via the control plane interface, current operational data and current operating conditions for the plurality of broadband lines from the access node; updating the virtualized implementation of the plurality of functions of the access node at the system according to the current operational data and the current operating conditions received from the access node; analyzing, via an analysis module of the system, the current operational data and the current operating conditions received from the access node; generating, via an instruction module, control parameters to affect operation of the access node based on the analysis of the current operational data and the current operating conditions received; and sending, via the control plane interface, the control parameters to the access node for adoption at the access node.

Figure 11:
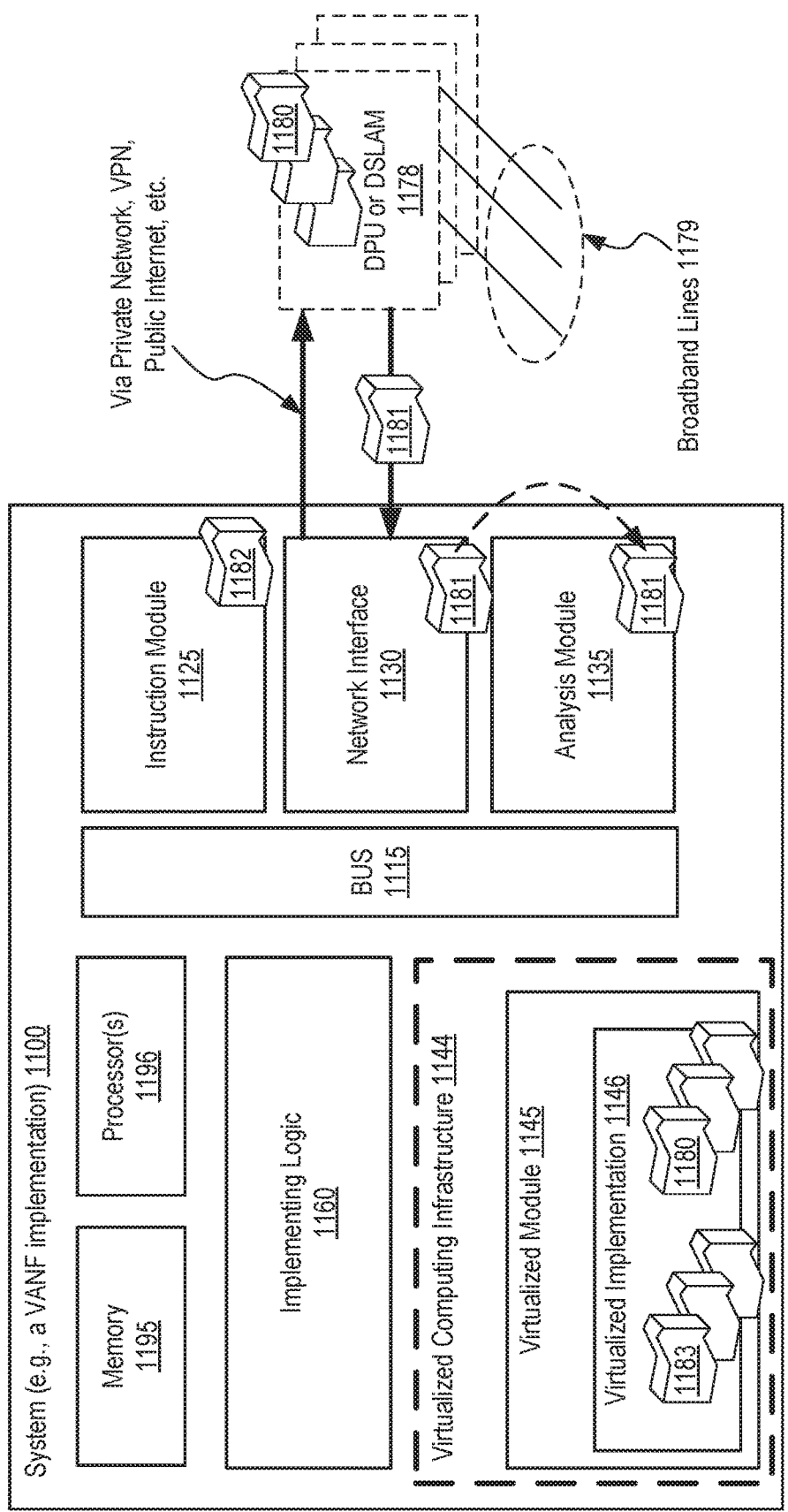
FIG. 11 illustrates a diagrammatic representation of a system in accordance with which embodiments may operate, be installed, integrated, or configured.

FIG. 11 illustrates a diagrammatic representation of a system 1100 (e.g., a VANF implementation) in accordance with which embodiments may operate, be installed, integrated, or configured.

In accordance with one embodiment, there is a system 1100 having at least a processor 1196 and a memory 1195 therein to execute implementing logic and/or instructions 1160. Such a system 1100 may communicatively interface with and cooperatively execute with the benefit of a hosted computing environment, such as an on-demand service provider, a cloud based service provider, or any entity which operates remotely from the network elements having functions being abstracted and virtualized by the remote system, in which the network elements are communicably interfaced over a network, such as a public Internet.

According to the depicted embodiment, system 1100 further includes a virtualized module 1145 operating on virtualized computing infrastructure 1144, in which the virtualized module 1145 is to provide a virtualized implementation 1146 of a plurality of functions 1180 associated with one or more remotely located Distribution Point Units (DPUs) and/or Digital Subscriber Line Access Multiplexers (DSLAMs) 1178, each of the one or more remotely located DPUs and/or DSLAMs 1178 having a plurality of broadband lines 1179 coupled thereto; in which the virtualized module 1145 is to further control Persistent Management Agent (PMA) functions 1183 and control coordination of the one or more remotely located DPUs and/or DSLAMs 1178 and the plurality of broadband lines 1179 coupled with the one or more remotely located DPUs and/or DSLAMs 1178 by virtualizing one or more functions 1180 of the one or more remotely located DPUs and/or DSLAMs 1178 to operate on the virtualized computing infrastructure 1144. Such a system 1100 further includes a network interface 1130 to receive data 1181 and to send control instructions 1182 for operation of the plurality of broadband lines 1179 to and from the one or more remotely located DPUs and/or DSLAMs 1178.

In accordance with another embodiment of system 1100, the virtualized module is to further communicate bi-directionally with the one or more remotely located DPUs and/or DSLAMs.

In accordance with another embodiment of system 1100, the virtualized module embodies a Virtualized Network Function (VNF) module to provide the virtualized implementation of the functions associated with one or more remotely located DPUs and/or DSLAMs; in which the VNF module to operate on the virtualized computing infrastructure of the system includes the VNF module to operate on a Virtualized Network Function Infrastructure (VNFI) using the processors and memory of this infrastructure; and in which the VNFI of the system virtualizes the functions of the one or more remotely located DPUs and/or DSLAMs locally at the system.

In accordance with another embodiment of system 1100, the network interface is to communicably link the system with the one or more remotely located DPUs and/or DSLAMs at least partially via a public or private Network; and in which the network interface includes a control plane interface to communicably link the virtualized module of the system with the one or more remotely located DPUs and/or DSLAMs.

In accordance with another embodiment of system 1100, the control plane interface of the system is to receive current operational data and current operating conditions for the plurality of broadband lines from the one or more remotely located DPUs and/or DSLAMs via the public or private Internet.

In accordance with another embodiment, system 1100 further includes: an analysis module 1135 to analyze the current operational data and the current operating conditions received from the one or more remotely located DPUs and/or DSLAMs; and an instruction module 1125 to generate control parameters to affect operation of the one or more remotely located DPUs and/or DSLAMs based on the analysis of the current operational data and the current operating conditions received.

In accordance with another embodiment of system 1100, the virtualized module is to update the virtualized implementation of the plurality of functions of the one or more remotely located DPUs and/or DSLAMs of the system according to the current operational data and the current operating conditions from the one or more remotely located DPUs and/or DSLAMs.

In accordance with another embodiment of system 1100, the virtualized module is updated by an Element Management Systems (EMS) and/or a Network Management Systems (NMS) communicably interfaced with the virtualized module of the system.

In accordance with another embodiment of system 1100, the EMS and/or NMS sends commands to the virtualized module of the system causing the virtualized module to add or change services and/or settings on one or more of the plurality of lines as represented within the virtualized implementation at the system; and in which the system further includes an analysis module to: (i) analyze the services and/or settings via the PMA functions, and (ii) control coordination of the one or more remotely located DPUs and/or DSLAMs by issuing commands to the one or more remotely located DPUs and/or DSLAMs based on the analysis of the services and/or settings.

In accordance with another embodiment of system 1100, each of the plurality of functions are selected from the group including: (i) zero-touch Operations, Administration, and Management (OAM) (ii) control and management of discontinuous operation, (iii) control and management of Dynamic Rate Allocation (DRA), (iv) derived telephony management, (v) Reverse Power Feed (RPF) management, (vi) management of power consumption and low-power link states, (vii) vectoring control and management, (viii) calculation of vectoring coefficients, (ix) layer 2 and above functionalities, (x) management of showtime-adaptive virtual noise, and (xi) control parameter determination.

In accordance with another embodiment of system 1100, the plurality of functions include an integrated and coordinated determination over the plurality of broadband lines of one or more control parameters, the one or more control parameters each selected from the group including: Dynamic Rate Allocation (DRA), discontinuous operation control parameters, power control parameters, vectoring control parameters, baseline bit bit-loading tables, active bit-loading tables, per sub-carrier gains control parameters, and transmitter-initiated gain adjustment (TIGA) control parameters.

In accordance with another embodiment of system 1100, the virtualized module to control the PMA functions and coordination of the one or more remotely located DPUs and/or DSLAMs includes: the virtualized module abstracting vectoring control from the one or more remotely located DPUs and/or DSLAMs, in which the vectoring control abstracted from the one or more remotely located DPUs and/or DSLAMs is performed locally upon the virtualized computing infrastructure via the virtualized module; and in which the system further includes the network interface to send control instructions for operation of the plurality of broadband lines to the one or more remotely located DPUs and/or DSLAMs, the control instructions specifying at least vectoring operations for the plurality of broadband lines.

In accordance with another embodiment of system 1100, the virtualized module further is to virtualize PMA functions abstracted from an Optical Line Termination (OLT) unit communicably linked with any one of the remotely located DPUs and/or DSLAMs.

In accordance with another embodiment of system 1100, the one or more remotely located DPUs embody a "Fiber To The distribution point" ("FTTdp") unit which operates the plurality of broadband lines according to one any one of: a Very-high-bit-rate Digital Subscriber Line ("VDSL") compliant communications standard; a G.fast compliant communications standard; a G.vdsl compliant communications standard; an ITU-T G.9701 compliant communications standard; or an ITU-T G.993.2 compliant communications standard.

In accordance with another embodiment, system 1100 further includes: the network interface to send control instructions for operation of the plurality of broadband lines at any one of the remotely located DPUs according to any of G.fast, G.vdsl, VDSL, ITU-T G.9701, or ITU-T G.993.2 compliant communications standards.

In accordance with another embodiment of system 1100, the virtualized computing infrastructure is implemented by a cloud computing service which operates in a geographic location different than the one or more remotely located DPUs and/or DSLAMs, and in which the cloud computing service is accessible to the one or more remotely located DPUs and/or DSLAMs over a public or private Internet.

In accordance with another embodiment of system 1100, the virtualized computing infrastructure is implemented within a datacenter which operates in a geographic location different than the one or more remotely located DPUs and/or DSLAMs, and in which the computing infrastructure is accessible to the one or more remotely located DPUs and/or DSLAMs over a private network interface or a Virtual Private Network (VPN) interface.

For instance, large network operators may choose to utilize their own cloud-computing platform or data center, and their own network between the cloud and the DPU/DSLAM rather subscribing to services provided by a third party. In such a case, the networking interconnect may be private or operate via a VPN established over public and/or private communication paths, and the cloud computing capabilities are not subscription services at all for such a large entity, but rather, are internally provided services.

In accordance with another embodiment of system 1100, the system embodies a cloud computing interface accessible via a public or private Internet, with the cloud computing infrastructure hosting virtualized functions of the one or more remotely located DPUs and/or DSLAMs including indirect access to and indirect control of the one or more remotely located DPUs and/or DSLAMs without requiring users of the cloud computing interface to directly access or directly authenticate to any one of the one or more remotely located DPUs and/or DSLAMs.

In one embodiment, system 1100 includes communication bus(es) 1115 to transfer transactions, instructions, requests, test results, analysis, current operating conditions, diagnostics inputs and outputs, outgoing instructions and configuration parameters, and other data within system 1100 among a plurality of peripheral devices communicably interfaced with one or more communication buses 1115. The network interface 1130 (e.g., or a control plane interface according to select embodiments) of system 1100 may further receive requests, return responses, and otherwise interface with network elements located separately from system 1100.

Figure 12:
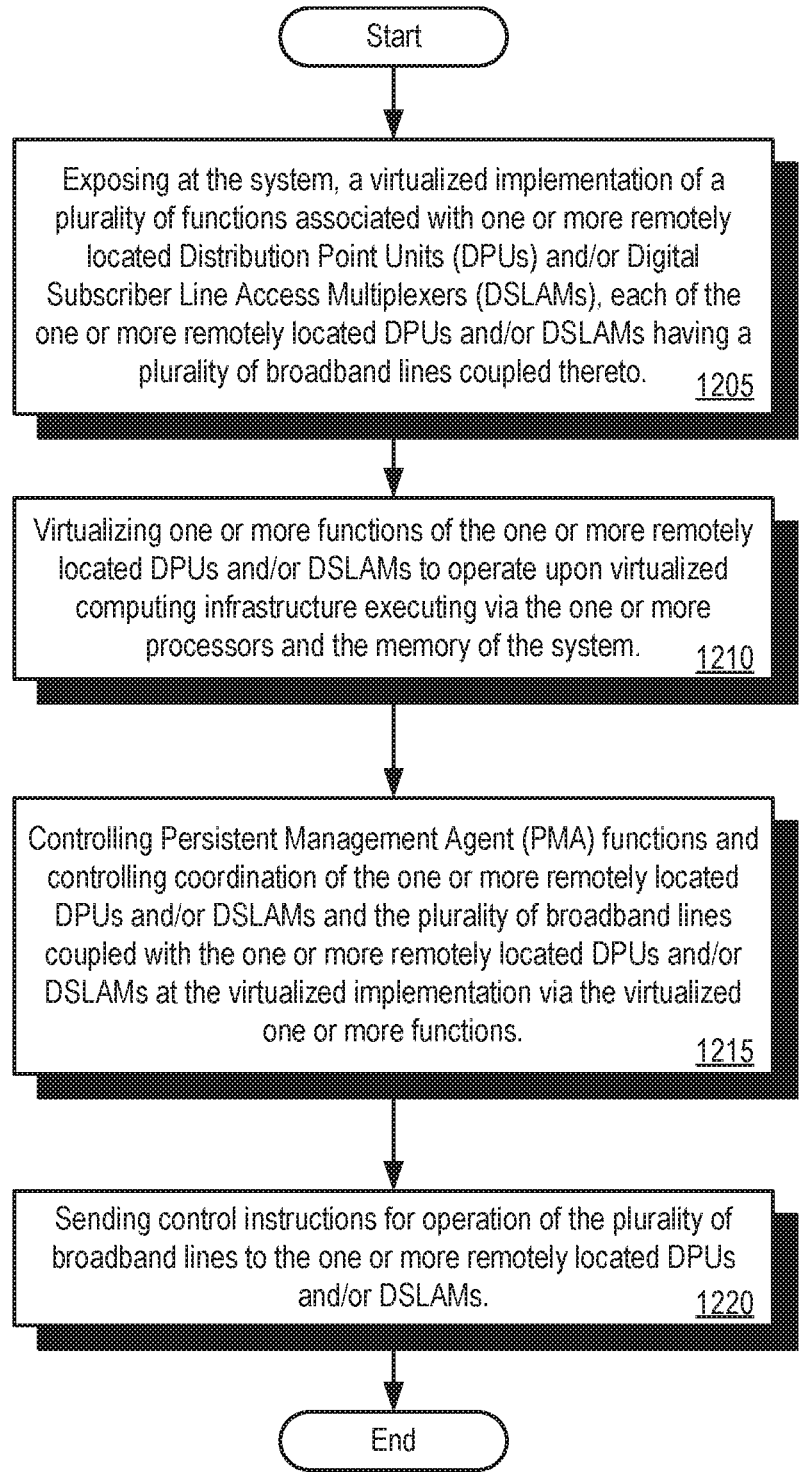
FIG. 12 depicts a flow diagram of a method for implementing Persistent Management Agent (PMA) functions for the control and coordination of DPU and DSLAM components.

FIG. 12 depicts a flow diagram of a method 1200 for implementing Persistent Management Agent (PMA) functions for the control and coordination of DPU and DSLAM components. Method 1200 may be performed by processing logic that may include hardware (e.g., circuitry, dedicated logic, programmable logic, microcode, etc.), software (e.g., instructions run on a processing device) to perform various operations such as exposing, managing, controlling, analyzing, collecting, generating, monitoring, diagnosing, executing, presenting, receiving, communicably interfacing, virtualizing, updating, analyzing, sending, communicating, receiving, transmitting, processing, providing, determining, triggering, displaying, retrieving, returning, etc., in pursuance of the systems and methods as described herein. For example, system(s) 170 as depicted at FIG. 1, the Management, Systems, Controller(s) 215 as depicted at FIG. 2, the architecture 800 as depicted at FIG. 8, systems 900 and 1100 at FIGS. 9 and 11 respectively, or the machine 1300 at FIG. 13, may implement the described methodologies. Some of the blocks and/or operations listed below are optional in accordance with certain embodiments. The numbering of the blocks presented is for the sake of clarity and is not intended to prescribe an order of operations in which the various blocks must occur.

Method 1200 begins at block 1205 with processing logic for exposing at the system, a virtualized implementation of a plurality of functions associated with one or more remotely located Distribution Point Units (DPUs) and/or Digital Subscriber Line Access Multiplexers (DSLAMs), each of the one or more remotely located DPUs and/or DSLAMs having a plurality of broadband lines coupled thereto.

At block 1210, processing logic virtualizes one or more functions of the one or more remotely located DPUs and/or DSLAMs to operate upon virtualized computing infrastructure executing via the one or more processors and the memory of the system.

At block 1215, processing logic controls Persistent Management Agent (PMA) functions and controlling coordination of the one or more remotely located DPUs and/or DSLAMs and the plurality of broadband lines coupled with the one or more remotely located DPUs and/or DSLAMs at the virtualized implementation via the virtualized one or more functions.

At block 1220, processing logic sends control instructions for operation of the plurality of broadband lines to the one or more remotely located DPUs and/or DSLAMs.

According to another embodiment of method 1200, virtualizing the one or more functions of the one or more remotely located DPUs and/or DSLAMs includes operating a Virtualized Network Function (VNF) module running on a Network Functions Virtualization Infrastructure (NFVI) via the virtualized computing infrastructure of the system.

According to another embodiment of method 1200, the Virtualized Network Function (VNF) module is controlled by one or more of a Virtualized Network Function Manager (VNFM); and a Network Function Virtualization Orchestrator (NFVO).

According to a particular embodiment, there is non-transitory computer readable storage media, having instructions stored thereupon that, when executed by one or more processors and memory of a virtualized cloud computing infrastructure, the instructions cause the system to perform operations including: exposing at the system, a virtualized implementation of a plurality of functions associated with one or more remotely located Distribution Point Units (DPUs) and/or Digital Subscriber Line Access Multiplexers (DSLAMs), each of the one or more remotely located DPUs and/or DSLAMs having a plurality of broadband lines coupled thereto; virtualizing one or more functions of the one or more remotely located DPUs and/or DSLAMs to operate upon virtualized computing infrastructure executing via the processors and the memory of the system; controlling Persistent Management Agent (PMA) functions and controlling coordination of the one or more remotely located DPUs and/or DSLAMs and the plurality of broadband lines coupled with the one or more remotely located DPUs and/or DSLAMs at the virtualized implementation via the virtualized one or more functions; and sending control instructions for operation of the plurality of broadband lines to the one or more remotely located DPUs and/or DSLAMs.

Figure 13:
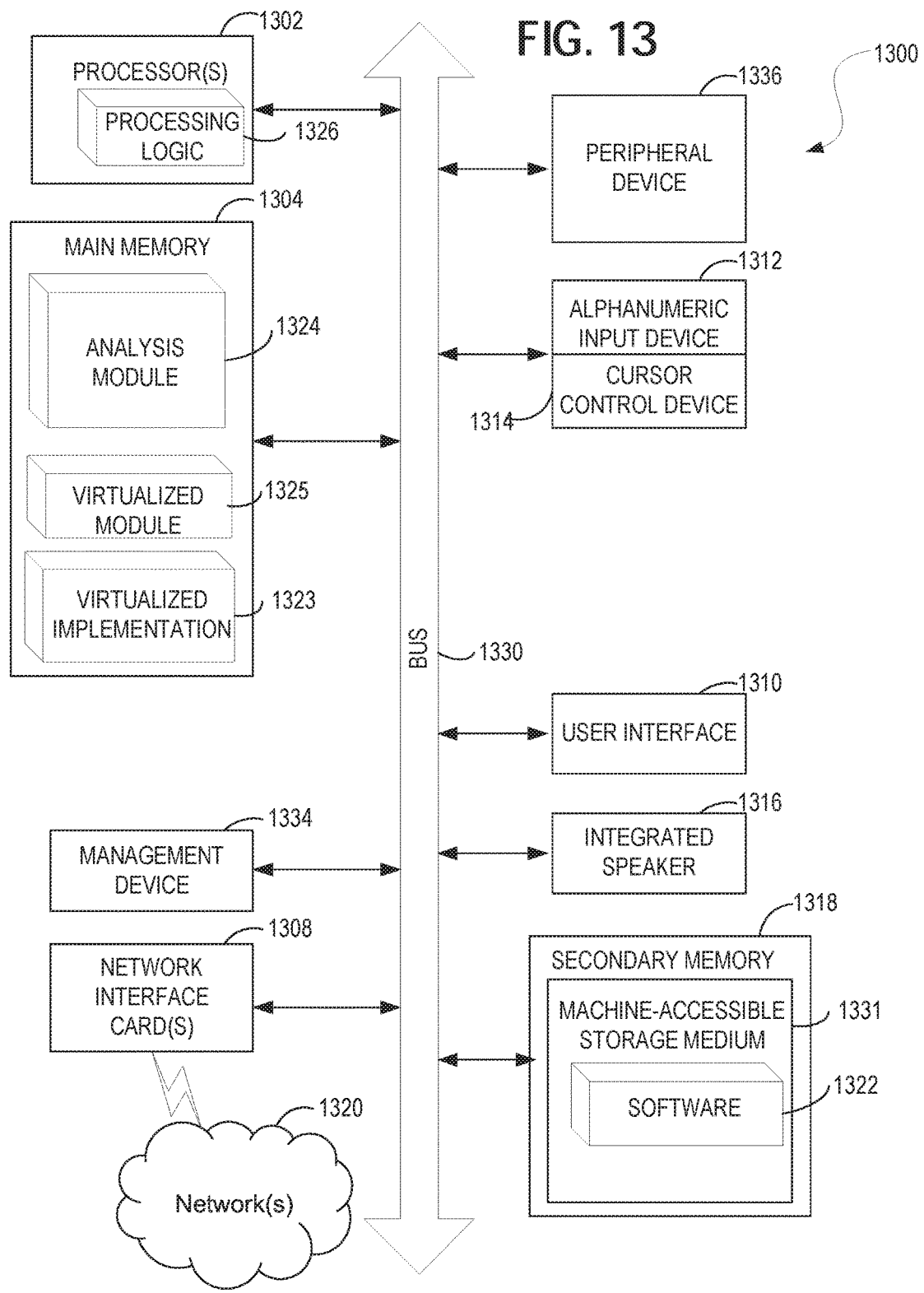
FIG. 13 illustrates a diagrammatic representation of a machine in the exemplary form of a computer system.

FIG. 13 illustrates a diagrammatic representation of a machine 1300 in the exemplary form of a computer system, in accordance with one embodiment, within which a set of instructions, for causing the machine 1300 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1300 includes processor(s) 1302, a main memory 1304 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1318 (e.g., a persistent storage device including hard disk drives and persistent data base implementations), which communicate with each other via a bus 1330. Main memory 1304 includes information and instructions and software program components necessary for performing and executing the functions with respect to the various embodiments of the systems, methods, and management device as described herein. Analysis module 1324, virtualized module 1325, and virtualized implementation 1323 may be stored within main memory 1304 and execute from main memory 1304 to carry out the methodologies as described herein. Main memory 1304 and its sub-elements (e.g., 1323, 1324, and 1325) are operable in conjunction with processing logic 1326 and/or software 1322 and processor(s) 1302 to perform the methodologies discussed herein.

Processor(s) 1302 may represent one or more general-purpose processing devices such as a microprocessor, central processing unit, or the like. More particularly, the processor(s) 1302 may be complex instruction set computing (CISC) microprocessors, reduced instruction set computing (RISC) microprocessors, very long instruction word (VLIW) microprocessors, processors implementing other instruction sets, or processors implementing a combination of instruction sets. Processor(s) 1302 may also be one or more special-purpose processing devices such as an application specific integrated circuit (ASIC), a field programmable gate array (FPGA), a digital signal processor (DSP), network processor, or the like. Processor(s) 1302 may be configured to execute the processing logic 1326 for performing the operations and functionality which is discussed herein.

The computer system 1300 may further include one or more network interface cards 1308 to communicatively interface the computer system 1300 with one or more networks 1320 from which information may be collected for analysis. The computer system 1300 also may include a user interface 1310 (such as a video display unit, a liquid crystal display (LCD), or a cathode ray tube (CRT)), an alphanumeric input device 1312 (e.g., a keyboard), a cursor control device 1314 (e.g., a mouse), and a signal generation device 1316 (e.g., an integrated speaker). The computer system 1300 may further include peripheral device 1336 (e.g., wireless or wired communication devices, memory devices, storage devices, audio processing devices, video processing devices, etc.). The computer system 1300 may perform the functions of a management device 1334 capable of interfacing with digital communication lines such as copper telephone lines within a vectored and non-vectored groups, monitoring, collecting, analyzing, and reporting information, and initiating, triggering, and executing various fault detection and localization instructions.

The secondary memory 1318 may include a non-transitory machine-readable storage medium (or more specifically a non-transitory machine-accessible storage medium) 1331 on which is stored one or more sets of instructions (e.g., software 1322) embodying any one or more of the methodologies or functions described herein. Software 1322 may also reside, or alternatively reside within main memory 1304, and may further reside completely or at least partially within the processor(s) 1302 during execution thereof by the computer system 1300, the main memory 1304 and the processor(s) 1302 also constituting machine-readable storage media. The software 1322 may further be transmitted or received over a network 1320 via the network interface card 1308.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
a memory to store instructions for execution;
one or more processors to execute the instructions;
a control plane interface to communicably interface the system with an access node over a network, wherein the access node is physically coupled with a plurality of broadband lines and comprises at least one of:

a Digital Subscriber Line Access Multiplexer (DSLAM);
a Distribution Point Unit (DPU);
an Optical Line Terminal (OLT); or
a Cable Modem Termination System (CMTS);
a virtualized module to provide a virtualized implementation of a plurality of functions of the access node at the system, wherein the virtualized module executes on a virtualized computing infrastructure;
the control plane interface of the system to receive current operational data and current operating conditions for the plurality of broadband lines from the access node;
the virtualized module to update the virtualized implementation of the plurality of functions of the access node at the system according to the current operational data and the current operating conditions received from the access node;
an analysis module to analyze the current operational data and the current operating conditions received from the access node;
an instruction module to generate control parameters to affect operation of the access node based on the analysis of the current operational data and the current operating conditions received; and
the control plane interface to send the control parameters to the access node for adoption at the access node.

2. The system of claim 1, wherein the virtualized module comprises a Virtualized Network Function (VNF) module running on a Network Functions Virtualization Infrastructure (NFVI), and controlled by one or more of:
a Virtualized Network Function Manager (VNFM); or
a Network Function Virtualization Orchestrator (NFVO).

3. The system of claim 1, wherein the control plane interface to send the control parameters to the access node for adoption at the access node comprises the control plane interface to instruct the access node to adopt the control parameters sent as a Previously presented operating configuration.

4. The system of claim 1, wherein the system embodies Virtualized Network Function (VNF) server functionality physically remote from the access node and in communication with the access node via the network.

5. The system of claim 4:
wherein the VNF server functionality is implemented by a third party service provider different than a broadband Internet operator that owns and is responsible for networking equipment to operate the plurality of broadband lines and different than a broadband services provider responsible for providing broadband communication services to broadband service customers; and
wherein the VNF server communicably interfaces to the access node over a public or private Internet through broadband networking elements of the broadband system operator or the broadband services provider.

6. The system of claim 5, wherein the third party service provider provides network virtualization services for the access node and the plurality of DSL lines within a DSL network as a subscription based cloud service.

7. The system of claim 1, wherein the plurality of broadband lines comprise a plurality of Digital Subscriber Lines (DSL lines) of a DSL network.

8. The system of claim 1, wherein the virtualized module is to virtualize functions of a broadband access node by defining one or more external interfaces the functions as they correspond to the broadband access node's functions, wherein the defined one or more external interfaces and the functions are to be deployed into a virtualized infrastructure within which the system operates.

9. The system of claim 1, wherein virtualized module virtualizes functions of a broadband access node, the functions being selected from the group comprising:
a Persistent Management Agent (PMA) function;
a Dynamic Rate Allocation (DRA) function;
a Power Control Entity (PCE) function;
a Vectoring Control Entity (VCE) function;
a managing Remote Power Feed (RPF) function;
a derived telephony management function;
a zero-touch Operations, Administration, and Management (OAM) function;
Class of Service (CoS) assignment functions;
Quality of Service (QoS) monitoring functions;
one or more functions to support, interpret, and handle dying gasp messages from transceivers;
one or more functions to perform Dynamic Spectrum Management (DSM);
one or more functions to implement control of a baseline bit-loading table;
one or more functions to implement control of an active bit-loading table;
one or more functions to implement control of sub-carrier gains;
one or more functions to implement control of a bit rates and SNR margins;
one or more functions to support consumer specified, provided, or managed applications that are to execute locally within the system or execute remotely from the system and interface back to the system; or
one or more functions to perform diagnostics.

10. The system of claim 1, wherein the virtualized module virtualizes functions for one or more of:
an Asymmetric Digital Subscriber Line (ADSL) implementation;
an ADSL1 implementation;
an ADSL2 implementation;
an ADSL2plus implementation;
a Very high speed Digital Subscriber Line (VDSL) implementation;
a VDSL1 implementation;
a VDSL2 implementation;
a vectored VDSL implementation;
a G.fast implementation;
a Fiber to the Node (FTTN) implementation;
a Fiber to the Distribution Point (FTTdp) implementation;
a Passive Optic Networks (PON) implementation;
a Gigabit PON (GPON) implementation;
a Next-Generation PON (NGPON) implementation;
a 10-Gigabit capable PON (XG-PON) implementation;
a Ethernet PON (EPON) implementation;
a 10 Gigabit PON (10GEPON) implementation;
a point-to-point Ethernet on fiber implementation; or
a Cable Modem Termination System (CMTS) implementation.

11. The system of claim 1:
wherein the virtualized module virtualizes functions for a network of Very high speed Digital Subscriber Lines (VDSL); and
wherein the virtualized module performs one or more of:
(i) power management and control of low-power link states for the network of VDSL lines,
(ii) Control and management of showtime-adaptive virtual noise or autonomous virtual noise on the network of VDSL lines, (iii) Vectoring management on the network of VDSL lines, or
(iv) Vectoring Control Entity (VCE) for the network of VDSL lines.

12. The system of claim 1, wherein the virtualized module virtualizes functions for at least one of:
managing traffic;
managing power;
vectoring for G.fast; or
determination over multiple of the broadband lines via one or more of: Dynamic Rate Allocation (DRA), discontinuous operation, power control, vectoring control, baseline bit-loading tables, active bit-loading tables, per sub-carrier gains, and Transmitter-Initiated Gain Adjustment (TIGA).

13. The system of claim 1, wherein the virtualized module implements a Virtual Persistent Management Agent or a Virtual G.fast Persistent Management Agent to persistently store diagnostics, to persistently store configuration information, to control and manage reverse power feed (RPF) information, to control connections from a Distribution Point Unit (DPU) to subscribers connected with the broadband lines, and/or to manage G.fast Low Power Modes (LPMs).

14. The system of claim 1, wherein the virtualized module virtualizes functions for a Passive Optical Network (PON) or an Optical Line Terminal (OLT), wherein the virtualized functions of the PON or the OLT are to perform one or more of:
Dynamic Bandwidth Allocation (DBA);
Time-slot allocation and scheduling for different users and different traffic types; or
wavelength assignments in Wavelength-Division Multiplexed (WDM) implementations or hybrid WDM/time-division PON implementations.

15. The system of claim 1, wherein the virtualized module virtualizes functions for a Cable Modem Termination System (CMTS), wherein the virtualized functions of the CMTS are to perform one or more of:
time-slot allocation;
time-slot scheduling;
time-slot traffic management;
radio Frequency (RF) channel assignment;
control of Quadrature Amplitude Modulation (QAM); or
control of channel bonding.

16. The system of claim 1, wherein the virtualized module virtualizes interfaces that enable Virtual Unbundled Loop Access (VULA).

17. The system of claim 1:
wherein the analysis module is to analyze one or more of test parameters, performance monitoring parameters, diagnostics parameters, and status parameters; and
wherein the analysis module is to further monitor Quality of Service (QoS), monitor Quality of Experience (QoE), monitor issuing alarms, analyze inputs to determine root cause and inform troubleshooting operations via analysis output.

18. The system of claim 17:
wherein the analysis module is to analyze input diagnostics or analyses output and responsively generate at least one of:
a recommend remediation or corrective action;
a trouble ticket;
a reconfiguration for the access node;
a line reconfiguration; or
a transceiver re-configuration.

19. The system of claim 1, wherein the control plane interface to send the control parameters to the access node for adoption at the access node comprises the control plane of the system to interact with at least one of:
a Physical Network Function (PNF);
a Broadband Network Gateway (BNG);
a Broadband Remote Access Server (BRAS);
a Customer Premises Equipment (CPE);
a Residential Gateways (RGs);
a Software-Defined Networking (SDN) controller;
one or more Management systems;
one or more Operations Support Systems (OSS);
one or more Business Support Systems (BSS); or
one or more Element Management Systems (EMS).

20. The system of claim 1, wherein the virtualized module provides the virtualized implementation of the plurality of functions of the access node within a virtual machine to execute on the system, wherein the virtual machine is to be backed up onto persistent storage as an archive, and wherein the virtual machine is redistributable to other systems capable of executing the virtualized implementation of the plurality of functions of the access node.

21. The system of claim 1, wherein the virtualized module provides the virtualized implementation of the plurality of functions of the access node either centralized within a single infrastructure or distributed across disparate infrastructure.

22. The system of claim 1, wherein the virtualized module provides the virtualized implementation of the plurality of functions of the access node via service chaining with either multiple chained Virtualized Network Function Components (VNFCs) or within parallel VNFCs, the VNFCs being controlled by an orchestration function exposed at the system.

23. The system of claim 1, wherein the virtualized module is to perform reconfigurations responsive to an input having a measure of consumer satisfaction therein, the measure of consumer satisfaction constituting one or more of:
consumer input;
an estimate of consumer satisfaction determined by a monitoring system;
an estimate of consumer satisfaction determined by a service quality management system; or
an estimate of consumer satisfaction provided by a service provider.

24. A computer-implemented method to be performed within a system having at least a processor and a memory therein, wherein the computer-implemented method comprises:
communicably interfacing a control plane interface of the system to an access node over a network, wherein the access node is physically coupled with a plurality of broadband lines and comprises at least one of:
a Digital Subscriber Line Access Multiplexer (DSLAM);
a Distribution Point Unit (DPU);
an Optical Line Terminal (OLT); or
a Cable Modem Termination System (CMTS);
virtualizing a plurality of functions of the access node at the system;
providing a virtualized implementation of the virtualized functions of the access node via a virtualized module of the system, wherein the virtualized module executes on a virtualized computing infrastructure;
receiving, via the control plane interface, current operational data and current operating conditions for the plurality of broadband lines from the access node;

updating the virtualized implementation of the plurality of functions of the access node at the system according to the current operational data and the current operating conditions received from the access node;

analyzing, via an analysis module of the system, the current operational data and the current operating conditions received from the access node;

generating, via an instruction module, control parameters to affect operation of the access node based on the analysis of the current operational data and the current operating conditions received; and sending, via the control plane interface, the control parameters to the access node for adoption at the access node.

25. The computer-implemented method of claim 24, wherein the virtualized module comprises a Virtualized Network Function (VNF) module running on a Network Functions Virtualization Infrastructure (NFVI), and controlled by one or more of:

a Virtualized Network Function Manager (VNFM); or a Network Function Virtualization Orchestrator (NFVO).

26. Non-transitory computer readable storage media, having instructions stored thereupon that, when executed by one or more processors and memory of a virtualized cloud computing infrastructure, the instructions cause the system to perform operations comprising:

communicably interfacing a control plane interface of the system to an access node over a network, wherein the access node is physically coupled with a plurality of broadband lines;

virtualizing a plurality of functions of the access node at the system;

providing a virtualized implementation of the virtualized functions of the access node via a virtualized module of the system, wherein the virtualized module executes on the virtualized cloud computing infrastructure;

receiving, via the control plane interface, current operational data and current operating conditions for the plurality of broadband lines from the access node;

updating the virtualized implementation of the plurality of functions of the access node at the system according to the current operational data and the current operating conditions received from the access node;

analyzing, via an analysis module of the system, the current operational data and the current operating conditions received from the access node;

generating, via an instruction module, control parameters to affect operation of the access node based on the analysis of the current operational data and the current operating conditions received; and sending, via the control plane interface, the control parameters to the access node for adoption at the access node.

27. The non-transitory computer readable storage media of claim 25:

wherein the virtualized module comprises a Virtualized Network Function (VNF) module running on a Network Functions Virtualization Infrastructure (NFVI), and controlled by one or more of (i) a Virtualized Network Function Manager (VNFM) or (ii) a Network Function Virtualization Orchestrator (NFVO); and wherein the system embodies Virtualized Network Function (VNF) server functionality physically remote from the access node and in communication with the access node via the network.

* * * * *